United States Patent
Jeong et al.

(10) Patent No.: US 11,736,692 B2
(45) Date of Patent: Aug. 22, 2023

(54) IMAGE ENCODING DEVICE AND IMAGE DECODING DEVICE USING TRIANGULAR PREDICTION MODE, AND IMAGE ENCODING METHOD AND IMAGE DECODING METHOD PERFORMED THEREBY

(71) Applicant: SAMSUNG ELECTRONICS CO., LTD., Suwon-si (KR)

(72) Inventors: Seungsoo Jeong, Suwon-si (KR); Anish Tamse, Suwon-si (KR); Minsoo Park, Suwon-si (KR); Minwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/416,984

(22) PCT Filed: Dec. 20, 2019

(86) PCT No.: PCT/KR2019/018217
§ 371 (c)(1),
(2) Date: Jun. 21, 2021

(87) PCT Pub. No.: WO2020/130712
PCT Pub. Date: Jun. 25, 2020

(65) Prior Publication Data
US 2022/0109834 A1    Apr. 7, 2022

Related U.S. Application Data

(60) Provisional application No. 62/783,662, filed on Dec. 21, 2018.

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/176* (2014.11); *H04N 19/52* (2014.11); *H04N 19/91* (2014.11)

(58) Field of Classification Search
CPC ...... H04N 19/159; H04N 19/70; H04N 19/11; H04N 19/157; H04N 19/96; H04N 19/46;
(Continued)

(56) References Cited

U.S. PATENT DOCUMENTS 10,356,413 B1 *   7/2019   Sim ..................... H04N 19/12
10,477,205 B1 *  11/2019   Sim ..................... H04N 19/105
(Continued)

FOREIGN PATENT DOCUMENTS

CN    108476319 A    8/2018
EP    3 891 975       6/2020
(Continued)

OTHER PUBLICATIONS

International Search Report (PCT/ISA/210) issued by the International Searching Authority in International Application No. PCT/KR2019/018217, dated Apr. 8, 2020.
(Continued)

*Primary Examiner* — Daniel Chang
(74) *Attorney, Agent, or Firm* — Sughrue Mion, PLLC

(57) ABSTRACT

An image decoding method including: obtaining, from a bitstream, information related to a triangle prediction mode for a current block; splitting the current block into two triangular partitions, according to the information related to a triangle prediction mode; generating a merge list for a triangle prediction mode, according to a merge list generation method in a regular merge mode; selecting a motion vector for the two triangular partitions according to information indicating the motion vector from among motion vectors included in the merge list; obtaining, from a refer-
(Continued)

ence image, prediction blocks corresponding to the two triangular partitions, based on the motion vector; and reconstructing the current block, based on a final prediction block.

5 Claims, 30 Drawing Sheets

(51) Int. Cl.
*H04N 19/176* (2014.01)
*H04N 19/52* (2014.01)
*H04N 19/91* (2014.01)

(58) Field of Classification Search
CPC .... H04N 19/119; H04N 19/61; H04N 19/105; H04N 19/176; H04N 19/137; H04N 19/513
See application file for complete search history.

(56) References Cited

U.S. PATENT DOCUMENTS

| | | | |
|---|---|---|---|
| 10,666,940 B2 | 5/2020 | Park et al. | |
| 10,819,978 B2 | 10/2020 | Tamse et al. | |
| 2011/0200111 A1* | 8/2011 | Chen | H04N 19/137 375/240.16 |
| 2017/0332099 A1 | 11/2017 | Lee et al. | |
| 2017/0339425 A1 | 11/2017 | Jeong et al. | |
| 2018/0249156 A1* | 8/2018 | Heo | H04N 19/105 |
| 2018/0343455 A1* | 11/2018 | Jang | H04N 19/45 |
| 2018/0376149 A1* | 12/2018 | Zhang | H04N 19/182 |
| 2019/0014334 A1* | 1/2019 | Samuelsson | H04N 19/48 |
| 2019/0045195 A1* | 2/2019 | Gokhale | H04N 19/14 |
| 2019/0273921 A1* | 9/2019 | Abe | H04N 19/176 |
| 2019/0306511 A1* | 10/2019 | Jang | H04N 19/11 |
| 2019/0335181 A1* | 10/2019 | Abe | H04N 19/119 |
| 2019/0335208 A1 | 10/2019 | Lim et al. | |
| 2020/0007882 A1* | 1/2020 | Abe | H04N 19/159 |
| 2020/0162736 A1* | 5/2020 | Seok | H04N 19/124 |
| 2020/0228832 A1* | 7/2020 | Tsai | H04N 19/176 |
| 2020/0296386 A1* | 9/2020 | Giladi | H04N 19/46 |
| 2020/0304810 A1* | 9/2020 | Moon | H04N 19/136 |
| 2020/0366923 A1* | 11/2020 | Zhang | H04N 19/70 |
| 2020/0389671 A1* | 12/2020 | Zhao | H04N 19/119 |
| 2021/0127131 A1 | 4/2021 | Lim et al. | |

FOREIGN PATENT DOCUMENTS

| | | | | |
|---|---|---|---|---|
| KR | 10-2017-0059423 A | 5/2017 | | |
| KR | 1020170084055 A | 7/2017 | | |
| KR | 10-2018-0061041 A | 6/2018 | | |
| KR | 10-2018-0082330 A | 7/2018 | | |
| WO | 2018/074825 A1 | 4/2018 | | |
| WO | WO-2019039324 A1 * | 2/2019 | ........... | H04N 19/117 |

OTHER PUBLICATIONS

International Preliminary Report on Patentability (PCT/IPEA/409) with a Translation of Written Opinion in International Application No. PCT/KR2019/018217, dated Apr. 26, 2021.
Ru-Ling Liao et al., "CE10.3.1.b: Triangular prediction unit mode", Joint Video Exploration Team (JVET), JVET-L0124-V2, Oct. 3-12, 2018, pp. 1-8 (8 pages total).
Communication dated Mar. 22, 2022 issued by the Korean Intellectual Property Office in KR Application No. 10-2021-7019226.
Max Blaser, et al., "Description of SDR and 360° video coding technology proposal by RWTH Aachen University", Joint Video Experts Team (JVET) of ITU-T SG 16 WP 3 and ISO/IEC JTC 1/SC 29/WG 11, 10$^{th}$ Meeting, JVET-J0023-v1, Apr. 2018, 102 pages.
Max Blaser, et al., CE10: Results on Geometric Partitioning (Experiments 3.2.a-3.2.c), Joint Video Experts Team of ITU-T SG 16 WP 3 and ISO/IEC JTC 1/SC 29/WG 11, 12$^{th}$ Meeting, JVET-L0417, Oct. 2018, 5 pages.
Tadamasa Toma, et al., "Description of SDR video coding technology proposal by Panasonic", Joint Video Experts Team of ITU-T SG 16 WP 3 and ISO/IEC JTC 1/SC 29/WG 11, 10$^{th}$ Meeting, JVET-J0020-v1, Apr. 2018, 75 pages.
Communication dated Oct. 27, 2022, issued by the Korean Intellectual Property Office in Korean Patent Application No. 10-2021-7019226.
Communication dated Nov. 16, 2022, issued by the European Patent Office in counterpart European Application No. 19899211.7.
Bross et al., "Versatile Video Coding (Draft 3)," Document: JVET-L1001-v7, Joint Video Experts Team (JVET) of ITU-T SG 16 WP 3 and ISO/IEC JTC 1/SC 29/WG 11, Oct. 2018, Total 223 pages, XP030215992.
Liao et al., "CE10.3.1.b: Triangular prediction unit mode," Document: JVET-L0124-v2, Joint Video Exploration Team (JVET) of ITU-T SG 16 WP 3 and ISO/IEC JTC 1/SC 29/WG11, Oct. 2018, Total 13 pages, XP030194820.
Wang et al., "Non-CE10: Triangle prediction merge list construction," Document: JVET-M0233-v1, Joint Video Experts Team (JVET) of ITU-T SG 16 WP 3 and ISO/IEC JTC 1/SC 29/WG 11, Jan. 2019, Total 3 pages, XP030213499.
Communication dated Jan. 4, 2023, issued by the INDIA Intellectual Property Office in Indian Patent Application No. 202127025156.
Communication dated Jul. 20, 2022 issued by the Korean Intellectual Property Office in KR Application No. KR Patent Application No. 10-2021-7019226.

* cited by examiner

FIG. 4
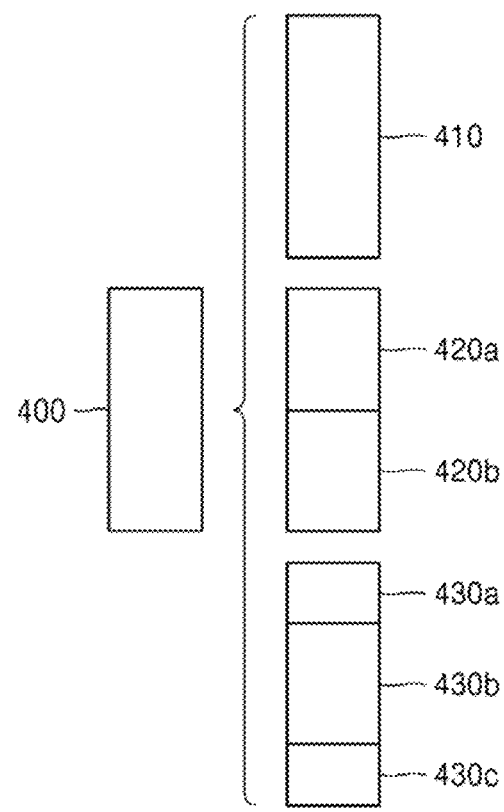
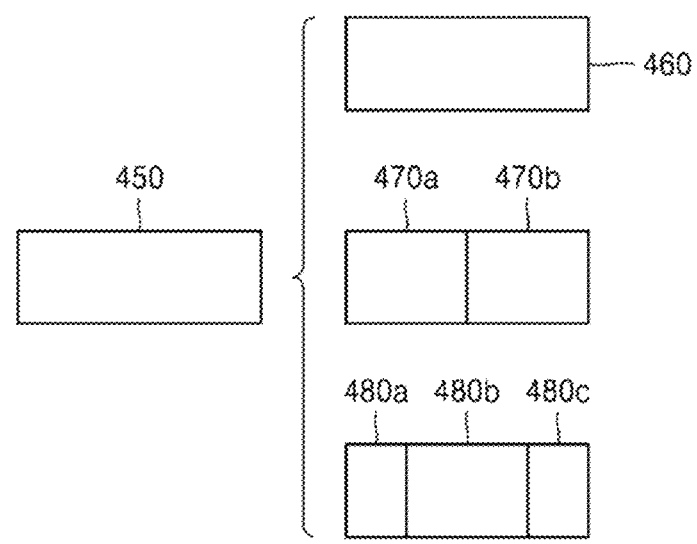

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ⊟ |
| (11)b | ⊟ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 19

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▬ | ▮ |
| (11)b | ▬ | ▮ |

FIG. 22

| | | |
|---|---|---|
| if(regular_merge_flag[x0][y0] == 1 { | — S2201 | |
|   if(sps_mmvd_enabled_flag) | | |
|     mmvd_merge_flag[x0][y0] | — S2202 | ae(v) |
|   if(mmvd_merge_flag[x0][y0] == 1) { | | |
|     if(MaxNumMergeCand > 1) | | |
|       mmvd_cand_flag[x0][y0] | — S2203 | ae(v) |
|     mmvd_distance_idx[x0][y0] | | ae(v) |
|     mmvd_direction_idx[x0][y0] | | ae(v) |
|   } else if(MaxNumMergeCand > 1) | | |
|     merge_idx[x0][y0] | — S2204 | ae(v) |
| } else { | | |
|   if(sps_ciip_enabled_flag && sps_triangle_enabled_flag && | — S2205 | |
|   MaxNumTriangleMergeCand>1 && slice_type == B && | A | |
|   cu_skip_flag[x0][y0] == 0 && | | |
|   (cbWidth * cbHeight ) >= 64 && cbWidth<128 && cbHeight<128) | | |
|     ciip_flag[x0][y0] | — S2206 | ae(v) |
|   if(ciip_flag[x0][y0] && MaxNumMergeCand > 1) | | |
|     merge_idx[x0][y0] | | ae(v) |
|   if(!ciip_flag[x0][y0] && MaxNumTriangleMergeCand > 1) { | — S2207 | |
|     merge_triangle_split_dir[x0][y0] | | ae(v) |
|     merge_triangle_idx0[x0][y0] | — S2208 | ae(v) |
|     if(MaxNumTriangleMergeCand > 2) | | |
|       merge_triangle_idx1[x0][y0] | | ae(v) |
|   } | | |
| } | | |

| MERGE LIST FOR REGULAR MERGE MODE ||
|---|---|
| 0 | B1 |
| 1 | B0 |
| 2 | A0 |
| 3 | B2 |
| 4 | Col |

| MERGE LIST FOR TRIANGLE PREDICTION MODE ||
|---|---|
| 0 | B1 |
| 1 | A0 |
| 2 | B2 |
| 3 | Col |
| 4 | B1+A0 |

| MERGE LIST FOR REGULAR MERGE MODE | |
|---|---|
| 0 | B1 |
| 1 | B0 |
| 2 | A0 |
| 3 | B2 |
| 4 | Col |

| MERGE LIST FOR TRIANGLE PREDICTION MODE | |
|---|---|
| 0 | B1 |
| 1 | A0 |
| 2 | B2 |
| 3 | B1+A0 |
| 4 | B1+B2 |

IMAGE ENCODING DEVICE AND IMAGE DECODING DEVICE USING TRIANGULAR PREDICTION MODE, AND IMAGE ENCODING METHOD AND IMAGE DECODING METHOD PERFORMED THEREBY

TECHNICAL FIELD

The disclosure relates to the fields of image encoding and decoding. More particularly, the disclosure relates to apparatuses for encoding and decoding an image by using a triangle prediction mode, and methods of encoding and decoding an image by the apparatuses.

BACKGROUND ART

In methods of encoding and decoding an image, respective blocks may be prediction encoded and prediction decoded through inter prediction or intra prediction.

The intra prediction refers to a method of compressing an image by deleting spatial redundancy in the image, and the inter prediction refers to a method of compressing an image by deleting temporal redundancy between images. A representative example of the inter-prediction is motion estimation encoding. In the motion estimation encoding, blocks of a current image are predicted by using at least one reference image. A reference block most similar to a current block may be searched for in a preset search range by using a preset evaluation function. The current block is predicted based on the reference block, and a residual block is generated by subtracting a prediction block generated as a result of the prediction from the current block and then encoded. Here, to further accurately perform the prediction, interpolation may be performed on a reference image so as to generate pixels of a sub pel unit smaller than an integer pel unit, and inter-prediction may be performed based on the pixels of sub pel unit.

In a codec such as H.264 advanced video coding (AVC) and high efficiency video coding (HEVC), a motion vector of pre-encoded blocks adjacent to a current block or blocks included in a pre-encoded picture is used as a prediction motion vector of the current bloc so as to predict a motion vector of the current block. A differential motion vector that is a difference between the motion vector of the current block and the prediction motion vector is signaled to a decoder according to a preset scheme. In a merge mode of inter prediction, instead of the differential motion vector being signaled to the decoder, information indicating a motion vector candidate to be used as a motion vector of a current block from among motion vector candidates included in a merge list generated according to a preset rule is signaled to the decoder.

DESCRIPTION OF EMBODIMENTS

Technical Problem

According to a technical objective, an image decoding apparatus and method and an image encoding apparatus and method according to an embodiment may set restrictions on a prediction mode of a current block, thereby preventing unnecessary information from being included in a bitstream.

Also, according to a technical objective, an image decoding apparatus and method and an image encoding apparatus and method according to an embodiment may simplify a process of encoding and decoding an image.

Solution to Problem

According to an embodiment, an image decoding method may include: obtaining, from a bitstream, information related to a triangle prediction mode for a current block split from an image; splitting the current block into two triangular partitions, according to the information related to a triangle prediction mode; generating a merge list for the triangle prediction mode, according to a merge list generation method in a regular merge mode in which the current block is reconstructed without being split into triangular partitions; selecting a motion vector for the two triangular partitions according to information indicating the motion vector from among motion vectors included in the merge list, the information being included in the information related to a triangle prediction mode; obtaining, from a reference image, prediction blocks corresponding to the two triangular partitions, based on the selected motion vector; and reconstructing the current block, based on a final prediction block obtained as a combination of the prediction blocks.

Advantageous Effects of Disclosure

According to an embodiment, an image decoding apparatus and method, and an image encoding apparatus and method may set restrictions on a prediction mode of a current block, thereby preventing unnecessary information from being included in a bitstream.

Also, according to an embodiment, an image decoding apparatus and method, and an image encoding apparatus and method may simplify a process of encoding and decoding are image.

However, effects achievable by an apparatus and method for decoding an image, and an apparatus and method for encoding an image, according to an embodiment, are not limited to those mentioned above, and other effects that not mentioned could be dearly understood by one of ordinary it in the art from the following descriptions.

BRIEF DESCRIPTION OF DRAWINGS

A brief description of each drawing is provided for better understanding of the drawings cited herein.

FIG. 4 illustrates a process, performed by an image decoding apparatus, of determining at least one coding unit by splitting a non-square coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 18 illustrates various shapes of a coding unit which may be determined based on split shape mode information that can be represented as a binary code, according to an embodiment.

FIG. 19 illustrates other shapes of a coding unit which may be determined based on split shape mode information that can be represented as a binary code, according to an embodiment.

FIG. 22 illustrates an example of a syntax structure for parsing information related to a triangle prediction mode, according to an embodiment.

BEST MODE

Figure 1:
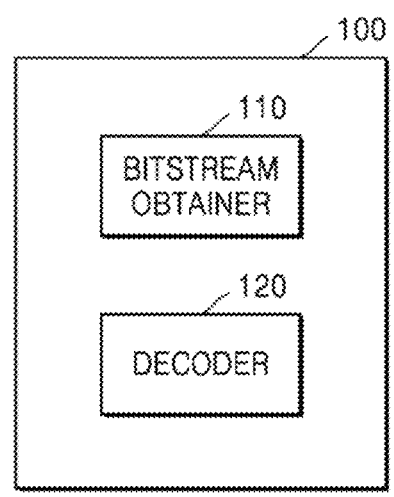
FIG. 1 is a block diagram of an image decoding apparatus according to an embodiment.

According to an embodiment, an image decoding method may include: obtaining, from a bitstream, information related to a triangle prediction mode for a current to split from an image; splitting the current block into two triangular partitions, according to the information related to a triangle prediction mode; generating a merge list for the triangle prediction mode, according to a merge list generation method in a regular merge mode in which the current block is reconstructed without being sport into triangular partitions; selecting a motion vector for the two triangular partitions according to information indicating the motion vector from among motion vectors included in the merge list, the information being included in the information related to a triangle prediction mode; obtaining, from a reference image, prediction blocks corresponding to the two triangular partitions, based on the selected motion vector; and reconstructing the current block, based on a final prediction block obtained as a combination of the prediction blocks.

In an embodiment, the merge list generation method in the regular merge mode may be a method of generating a merge list including motion vectors of blocks that are available from among spatial blocks being spatially related to the currant block and temporal blocks being temporally related to the current block.

The obtaining of, from the bitstream, the information related to a triangle prediction mode may include: comparing a size of the current block with a first threshold value; and when a result of the comparing satisfies a preset condition, obtaining, from the bitstream, the information related to a triangle prediction mode for the current block.

The obtaining of, from the bitstream, the information related to a triangle prediction mode may include: when a height of the current block is smaller than the first threshold value and a width of the current block is smaller than the first threshold value, obtaining the information related to a triangle prediction mode from the bitstream.

The comparing may include comparing the size of the current block with a second threshold value, and the obtaining of, from the bitstream, the information related to a triangle prediction mode may include: when the result of the comparing between the size of the current block and the first threshold value, and a result of the comparing between the size of the current block and the second threshold value satisfy the preset condition, obtaining the information related to a triangle prediction mode from the bitstream.

The comparing of the size of the current block with the second threshold value may include comparing a value obtained by multiplying a height of the current block by a width of the current block with the second threshold value.

The first threshold value may be greater than the second threshold value.

The obtaining of, from the bitstream, the information related to a triangle prediction mode may include, when a prediction mode of the current block is not an inter-intra combination mode, obtaining the information related to a triangle prediction mode from the bitstream.

When a prediction mode of the current block is a merge mode using a differential motion vector, the information related to a triangle prediction mode may not be obtained from the bitstream, and the image decoding method may further include reconstructing the current block according to the merge mode using a differential motion vector.

The reconstructing of the current block may include generating the final prediction block according to a weighted sum of sample values included in prediction blocks respectively corresponding to the two triangular partitions.

The splitting of the current block into the two triangular partitions may include splitting the current block from an upper-left corner of the current block toward a lower-right corner of the current block, or splitting the current block from an upper-right corner of the current block toward a lower-left corner of the current block.

According to an embodiment, an image decoding apparatus may include: an entropy decoder configured to obtain, from a bitstream, information related to a triangle prediction mode for a current block split from an image; and a prediction decoder configured to split the current block into two triangular partitions, according to the information related to a triangle prediction mode, generate a merge list for a triangle prediction mode, according to a merge list generation method in a regular merge mode in which the current block is restricted without being split into triangular partitions, select a motion vector for the two triangular partitions according to information indicating the motion vector from among motion vectors included in the merge list, the information being included in the information related to a triangle prediction mode, obtain, from a reference image, prediction blocks corresponding to the two triangular partitions, based on the selected motion vector, and reconstruct the current block, based on a final prediction block obtained as a combination of the prediction blocks.

According to an embodiment, an image encoding method may include determining a prediction mode of a current block to be a triangle prediction mode, the current block being split from an image; splitting the current block into two triangular partitions; generating a merge list for the triangle prediction mode, according to a merge list generation method in a regular merge mode in which the current block is reconstructed without being split into triangular partition; selecting a motion vector for the two triangular partitions from among motion vectors included in the merge list; and generating a bitstream including information related to a triangle prediction mode including information indicating the selected motion vector.

The determining of the prediction mode of the current block to be the triangle prediction mode may include: comparing a size of the current block with a first threshold value; and when a result of the comparing satisfies a preset condition, determining the prediction mode of the current block to be the triangle prediction mode.

Mode of Disclosure

As the disclosure allows for various changes and numerous examples, particular embodiments will be illustrated in the drawings and described in detail in the written descriptions. However, this is not intended to limit the disclosure to particular modes of practice, and it will be understood that all changes, equivalents, and substitutes that do not depart from the spirit and technical scope of various embodiments are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another element.

Also, in the present specification, an "image" or a "picture" may indicate a static image. Alternatively, the "image" or the "picture" may indicate each frame constituting a video, or the video itself.

Also, in the present specification, a "sample" or a "signal" indicates data allocated to a sampling position of an image, i.e., data to be processed. For example, in an image, pixel values in a spatial domain and transform coefficients on a transform domain may be samples. A unit including at least one such sample may be defined as a block.

Hereinafter, with reference to FIGS. 1 to 20, provided are an image encoding method and apparatus therefor and an image decoding method and apparatus therefor based on coding units and transform units of a tree structure according to an embodiment.

FIG. 1 illustrates a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions to be performed by the at least one processor.

The bitstream obtainer 110 may receive a bitstream. The bitstream includes information of an image encoded by an image encoding apparatus 200 described below. Also, the bitstream may be transmitted from the image encoding apparatus 200. The image encoding apparatus 200 and the image decoding apparatus 100 may be connected by wire or wirelessly, and the bitstream obtainer 110 may receive the bitstream by wire or wirelessly. The bitstream obtainer 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

In further descriptions of operations of the image decoding apparatus 100, the bitstream obtainer 110 may receive a bitstream.

The image decoding apparatus 100 may perform an operation of obtaining, from the bitstream, a bin string corresponding to a split shape mode of a coding unit. The image decoding apparatus 100 may perform an operation of determining a split rule of the coding unit. Also, the image decoding apparatus 100 may perform an operation of splitting the coding unit into a plurality of coding units, based on at least one of the bin string corresponding to the split shape mode and the split rule. The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chrome samples, and syntax structures used to encode the luma sample and the chrome samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma, sample, two corresponding coding blocks of chroma samples, and syntax structures used to encode the luma sample and the chrome samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be aware shape of the same size. However, the embodiment is not limited thereto.

For example, information about a maximum size of a luma coding block may be obtained from a bitstream. For example, the maximum size of the luma coding block indicated by the information about the maximum size of the fume coding block may be of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained the bitstream are combined with each other, a size of the luma largest coding unit may be determined. A size of a chrome largest coding unit may be determined by using the size of the luma largest coding unit. For example, when a Y:Cb:Cr ratio is 4:2:0 according to a color format, a size of a chrome block may be half a size of a luma block, and a size of a chrome largest coding unit may be half a size of a luma largest coding unit.

According to an embodiment, because information about a maximum size of a luma coding block that is binary splittable is obtained from a bitstream, the maximum size of the luma coding block that is binary splittable may be variably determined, in contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bistream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the spot type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split, into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left upper left, top, upper right, right, lower right of the current block.

Figure 3:
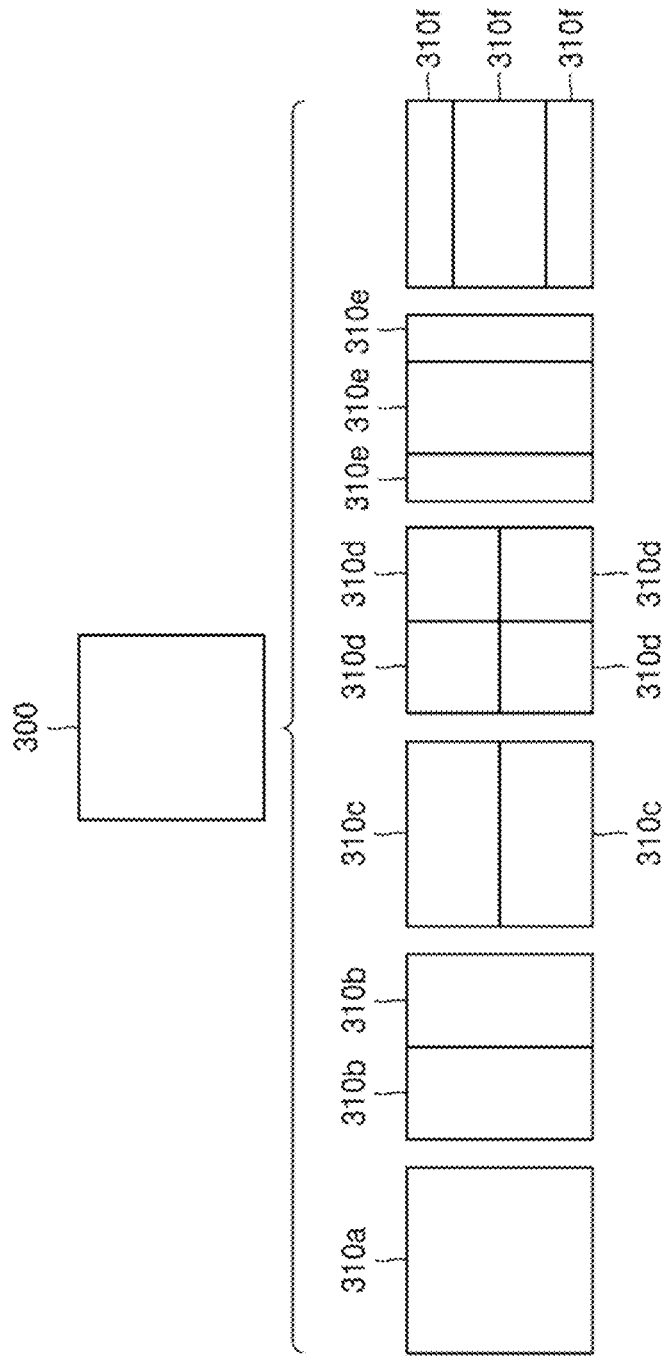
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction of a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine spot shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting be current coding unit 300 in vertical and horizontal directions, based on the split shape mode information indicating to perform spatting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

FIG. 4 illustrates a process, performed by the image decoding apparatus 100, of determining at least one coding unit by spatting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine a coding unit 410 or 480 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to splits a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, file block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 48.0b, and 480c generated as the current coding unit 400 or 450 is split to be different tom that of the other coding units 430a and 430c, or 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
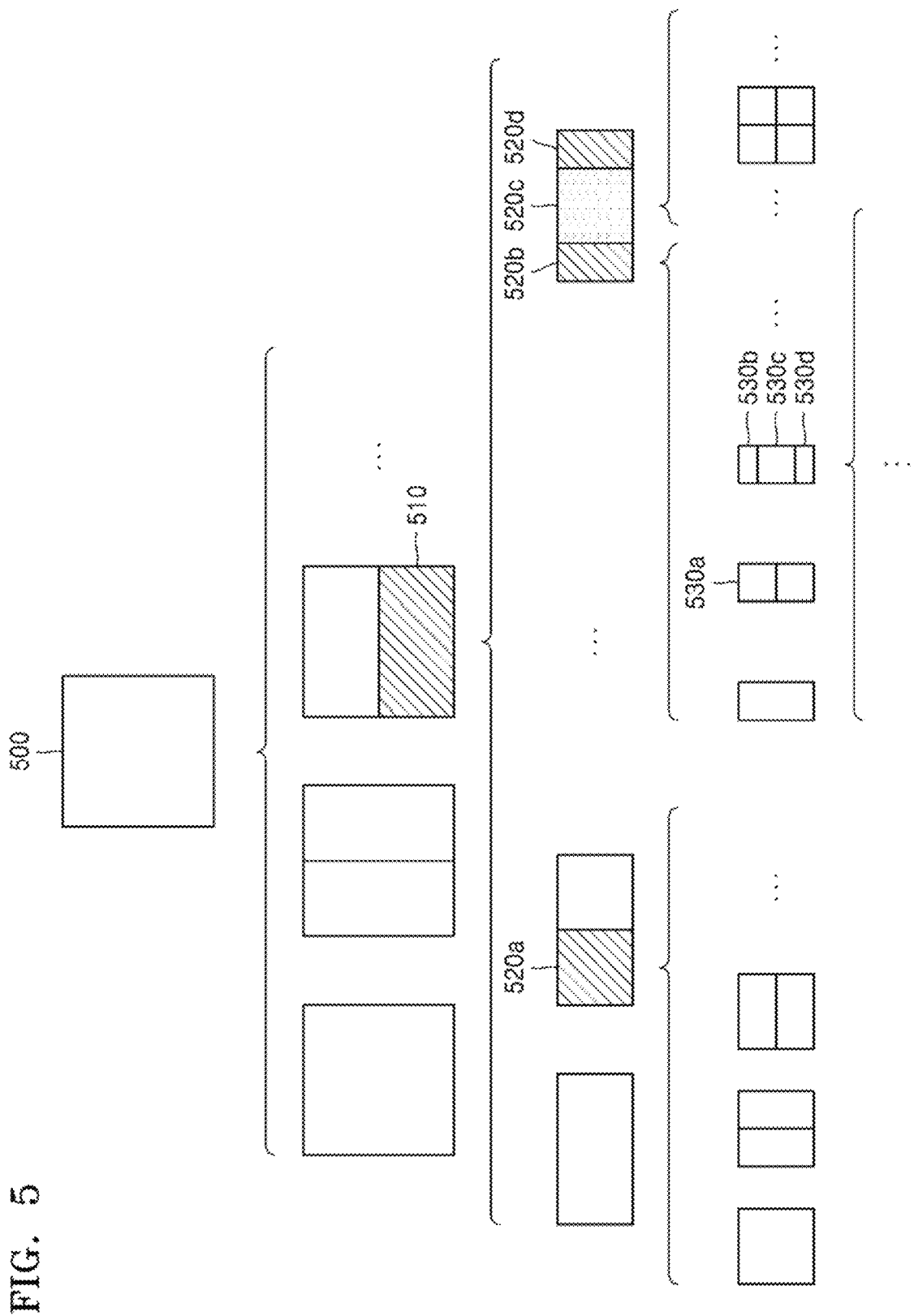
FIG. 5 illustrates process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or to not split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 600 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the end coding unit, and the third coding unit follows the above descriptions.

According to an embodiment, the image decoding apparatus 100 may determine to split or to not split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 610 may, be split by using a splitting method of the first coding unit 500 based on the split shape mode information. According to an embodiment, when the first coding unit 500 is split into the second coding units 510 based on the spill shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 610 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality at fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine to not split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
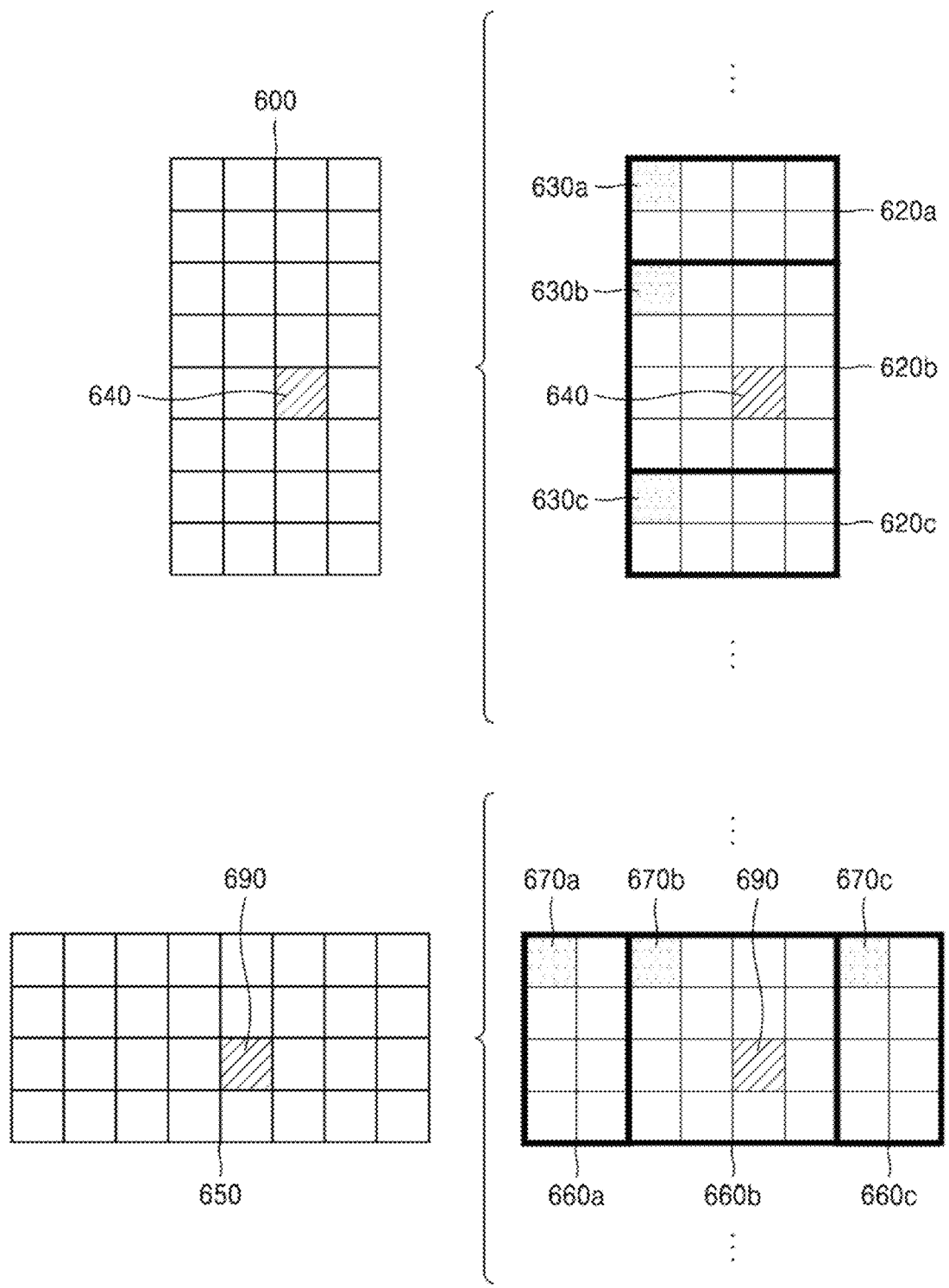
FIG. 6 illustrates a method, performed by an image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, tower right locations, or the like). The image decoding apparatus 100 may obtain the split shape mode information from the preset location and may determine to split or to not split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the canter coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ye) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the tower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-sett sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer then a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a spatting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 820b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 660 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 800 (e.g., a sample at a center location of the current coding unit 600) to determine a coding unit at a preset location from among the plurality of the coding units 620a, 620b, and 620c determined by splitting the current coding unit 600 (e.g. a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) can be obtained, from among the plurality of ceding units 620a, 620b, and 620c determined by splitting the current coding unit 600, and may put a preset restriction on the coding unit 620b. Referring to FIG. 6, according to an embodiment, the image decoding apparatus 100 may determine the sample $40 at the center location of the current coding unit 800 as the sample from which the preset information may be obtained, and may put a preset restriction on the coding unit 620b including the sample 640, in a decoding operation. However, the location of the sample from which the preset information can be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information can be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
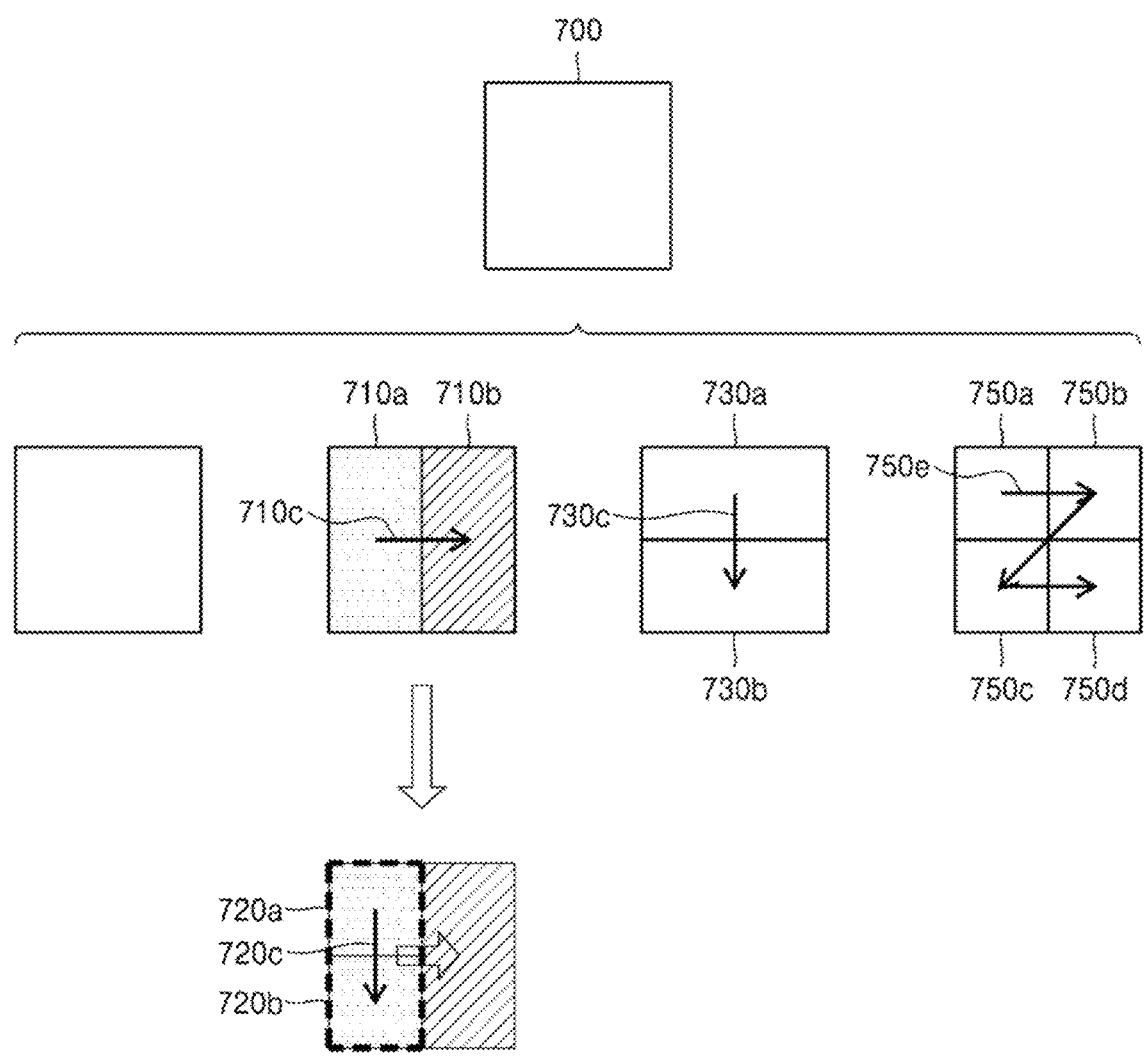
FIG. 7 illustrates an order of processing a plurality of coding unit when n image decoding apparatus determines the plurality of coding units by splitting a current coding unit, according to an embodiment.

FIG. 7 illustrates an order of processing a plurality of coding units when the image decoding apparatus 100 determines the plurality of =ding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 73W or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or to not split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processes hi the horizontal direction order 710c, the right second coding unit 710b may be processed after the third coding units 720a and 720b included in the left second coding unit 710a are processed in the vertical direction order 720c. An operation of determining a promising order of coding units based on a coding unit before being split is not limited to the above-described example, and various methods may be used to independently process coding units, which are split and determined to various shapes, in a preset order.

Figure 8:
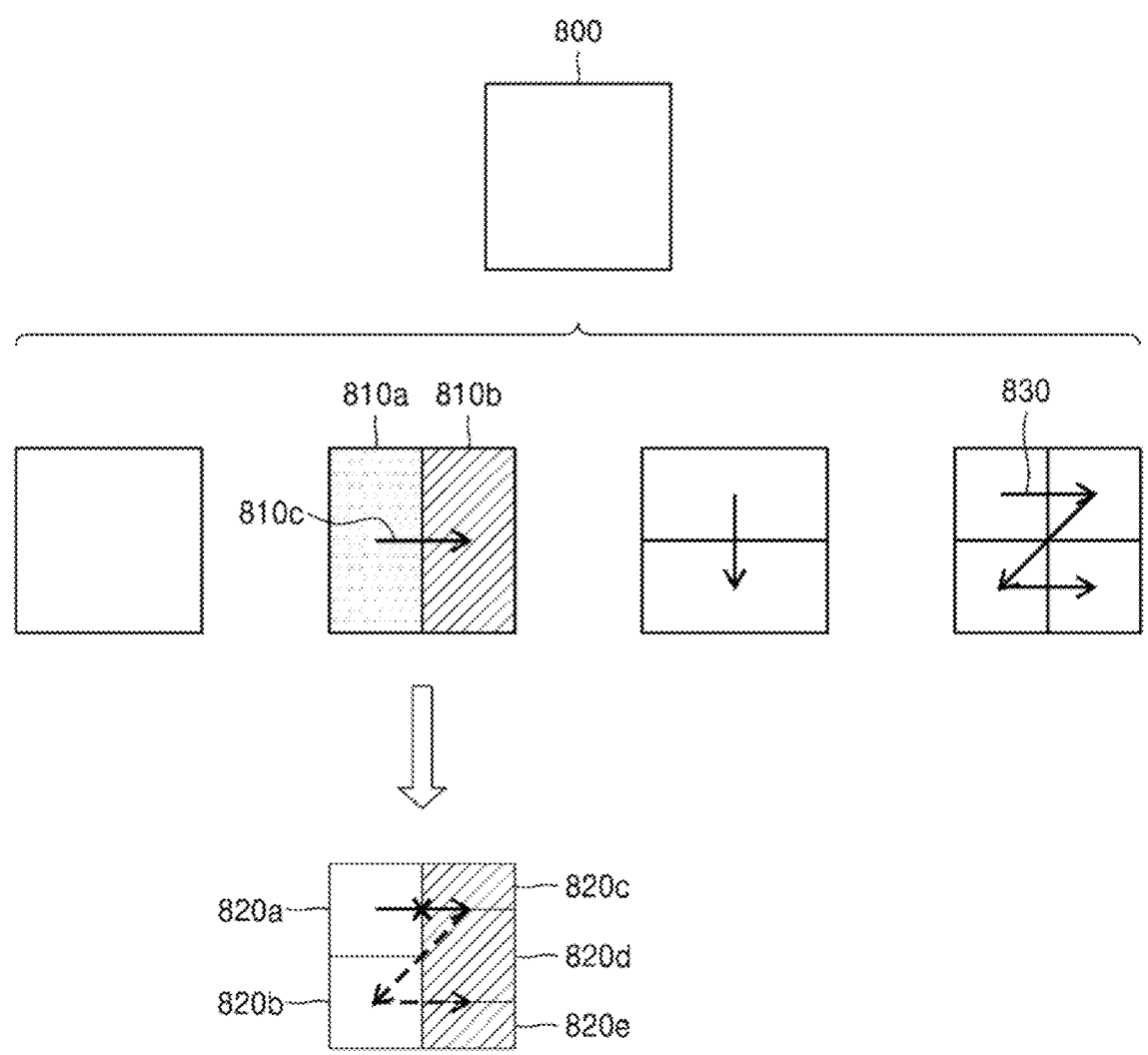
FIG. 8 illustrates a process, performed by a image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the video decoding apparatus 100 may determine whether any coding unit is split into an odd number of coding units, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition fix processing in the preset order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the or shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
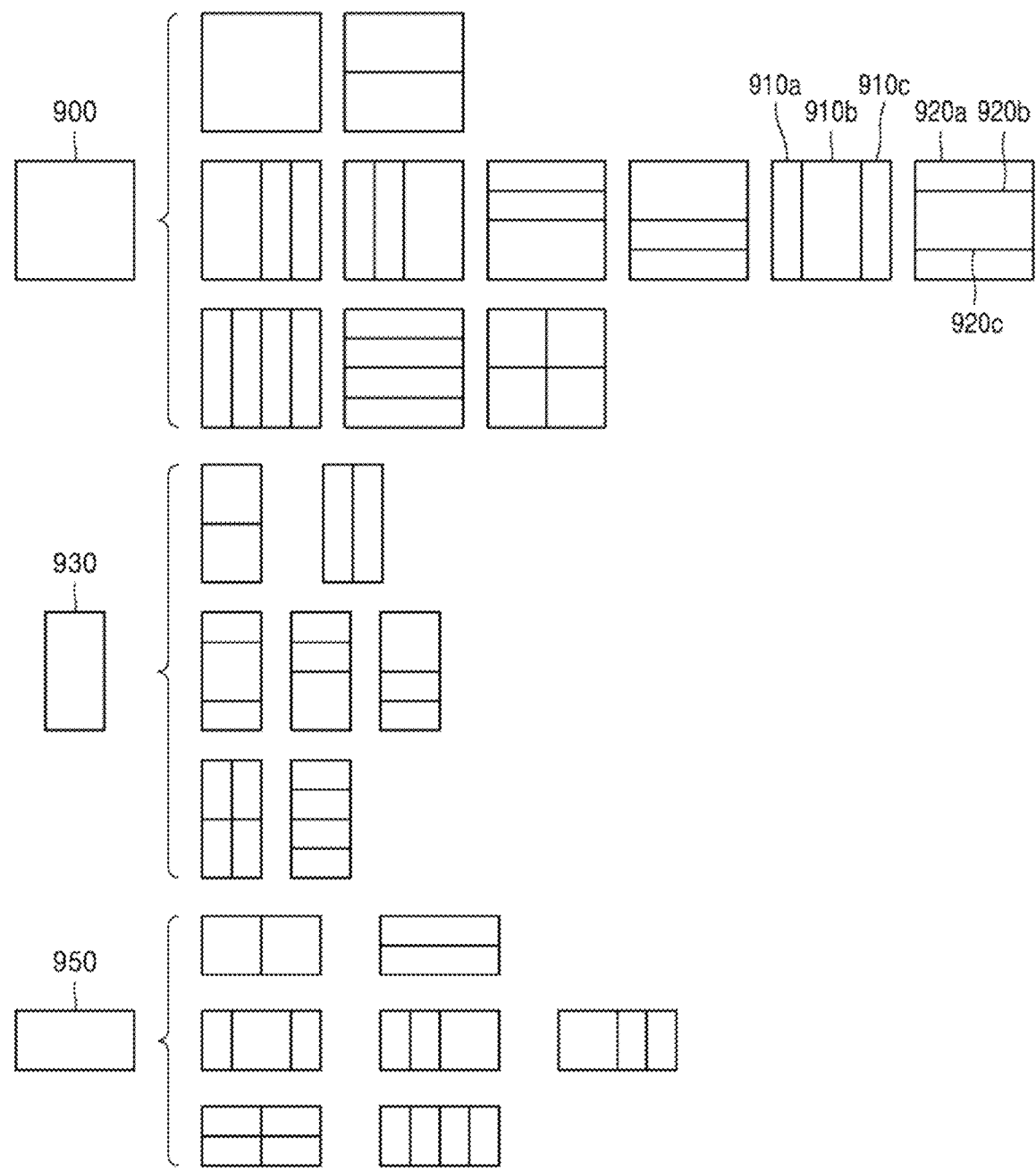
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bit trees obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by spatting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 800 in half, it may be determined that the first coding unit 900 does not satisfy the condition for processing in the preset order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction an a coding unit at a preset location from among the split coding units. The restriction or the preset location has been described above in relation to various embodiments, and thus detailed descriptions thereof will not be provided herein.

According to an embodiment the image decoding apparatus 100 may determine various-shaped coding units by spatting a first coding unit.

Referring to FIG. 9, the image decoding apparatus 100 may split the square first coding unit 900 or a non-square first coding unit 930 or 950 into various-shaped coding units.

Figure 10:
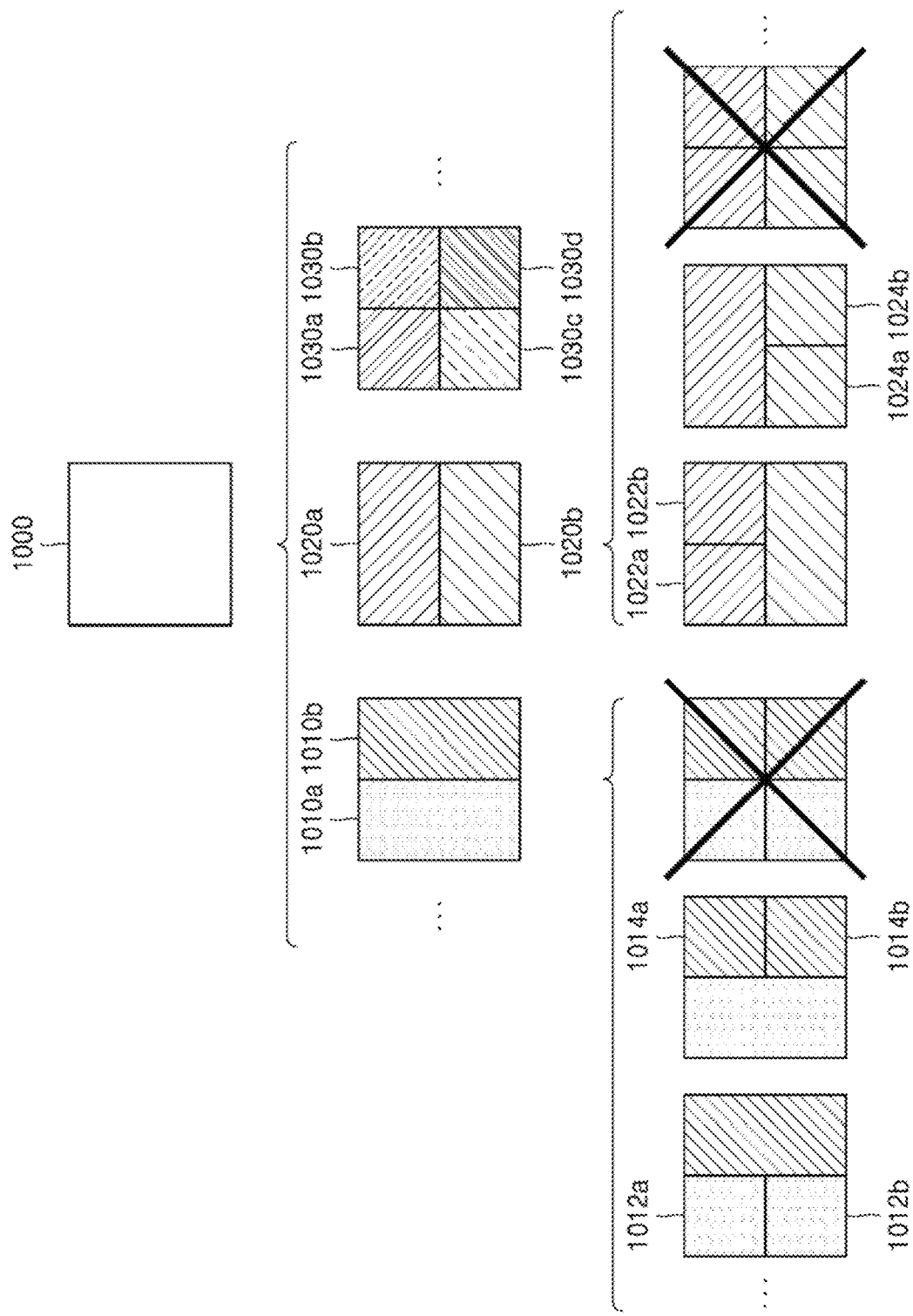
FIG. 10 illustrates that a shape into which a second coding unit is splittable restricted when the second coding unit having a non-square shape, which is determined when an image decoding apparatus splits a first coding unit, satisfies a preset condition, according to an embodiment.

FIG. 10 illustrate that a shape into which a second coding unit is splittable is restricted when the second coding unit having a non-square shape, which is determined when the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010a, and 1010b or 1020a and 1020b, based on spit shape mode information, which is obtained by the bitstream obtainer 110. The second coding units 1010a and 1010b, or 1020a and 1020b may be independently split. As such, the image decoding apparatus 100 may determine to split or to not split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
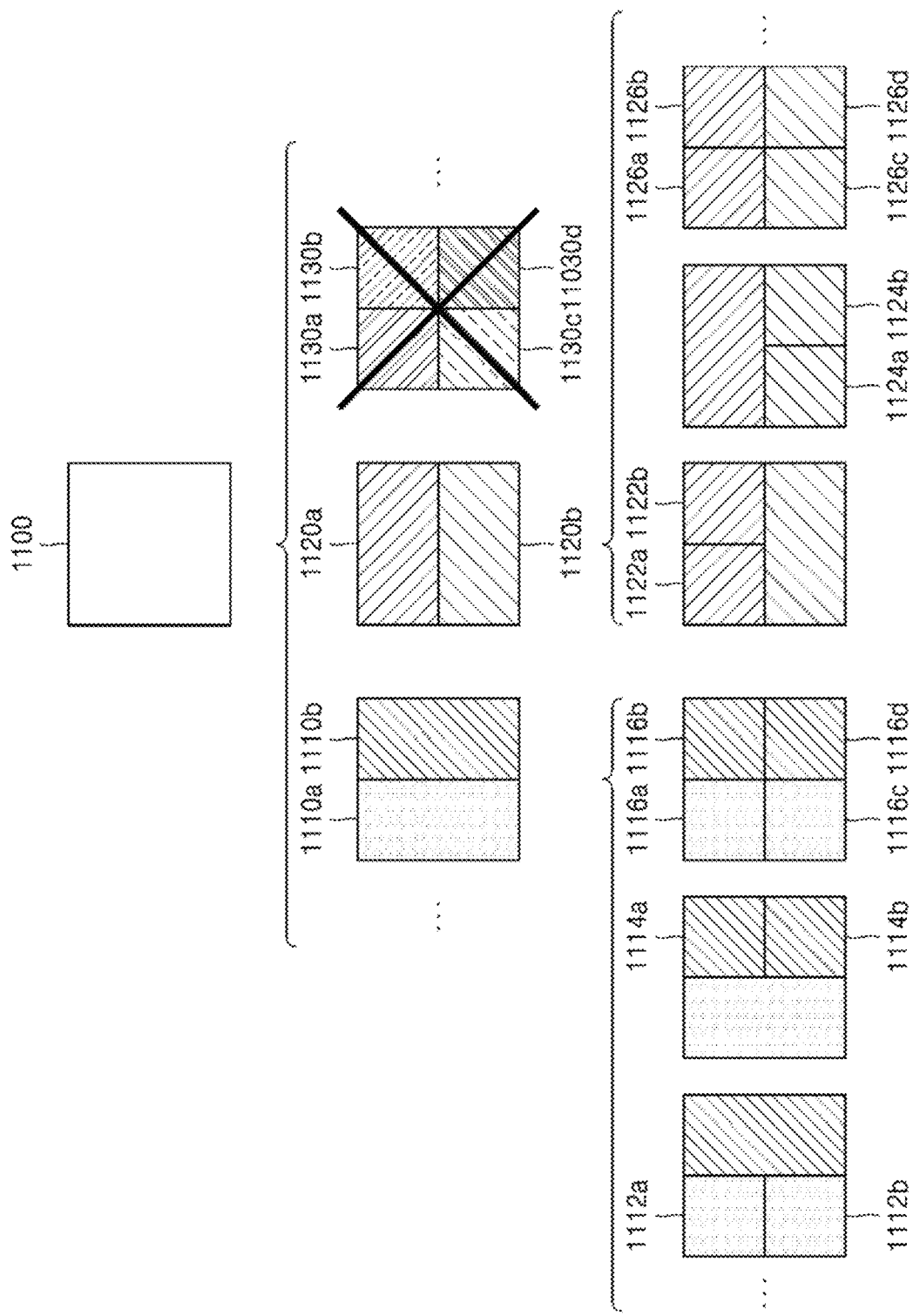
FIG. 11 illustrates a process, performed by an it e decoding apparatus, of splitting a square coding unit when split shape mode information indicates that the square coding unit is to not be split into four square coding units, according to an embodiment.

FIG. 11 illustrates a process, performed by the image decoding apparatus 100, of spitting a square coding unit when split shape mode information indicates that the square coding unit is to not be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130e, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the tower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
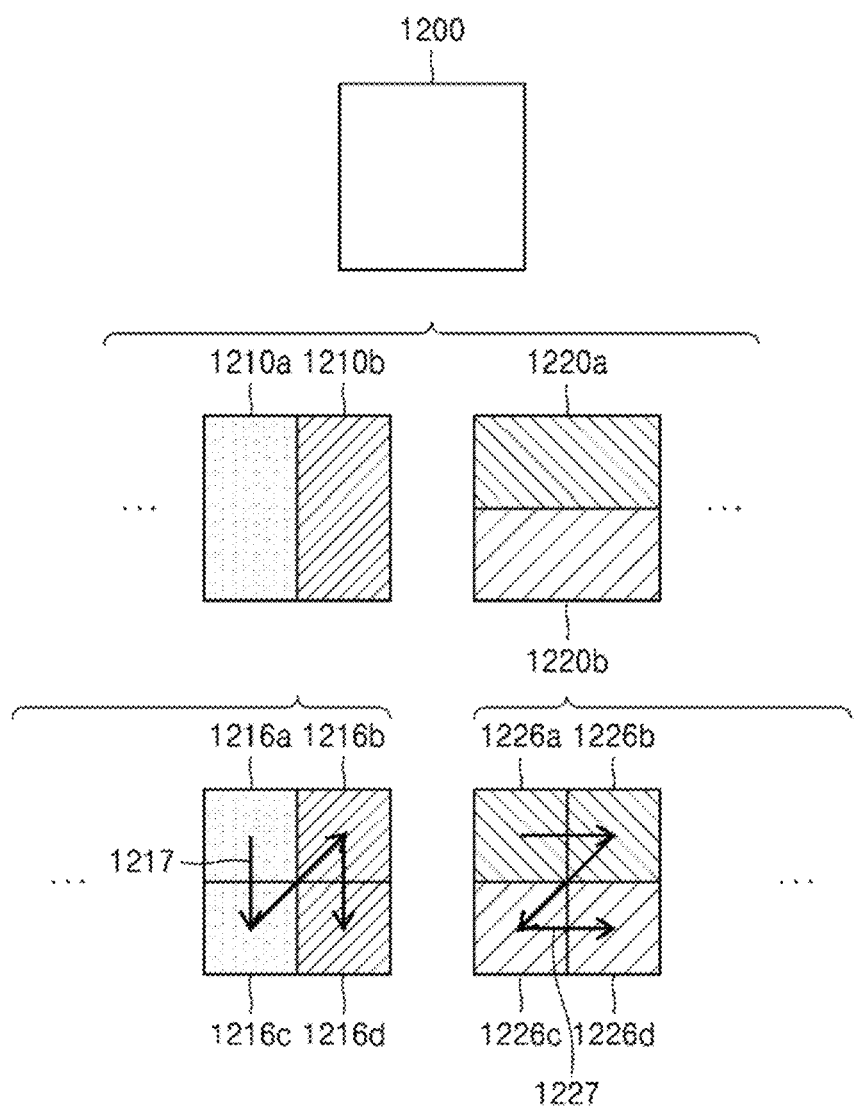
FIG. 12 illustrates that a processing order between a plurality of coding units may be changed depending on a process of splitting a coding unit, according to an embodiment.

FIG. 12 illustrates that processing order between a plurality of coding units may be changed depending on a press of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the in decoding apparatus 100 may de ermine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a tower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1 and a depth of the third coding unit 1304, the width and height of whit are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information in a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by spatting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
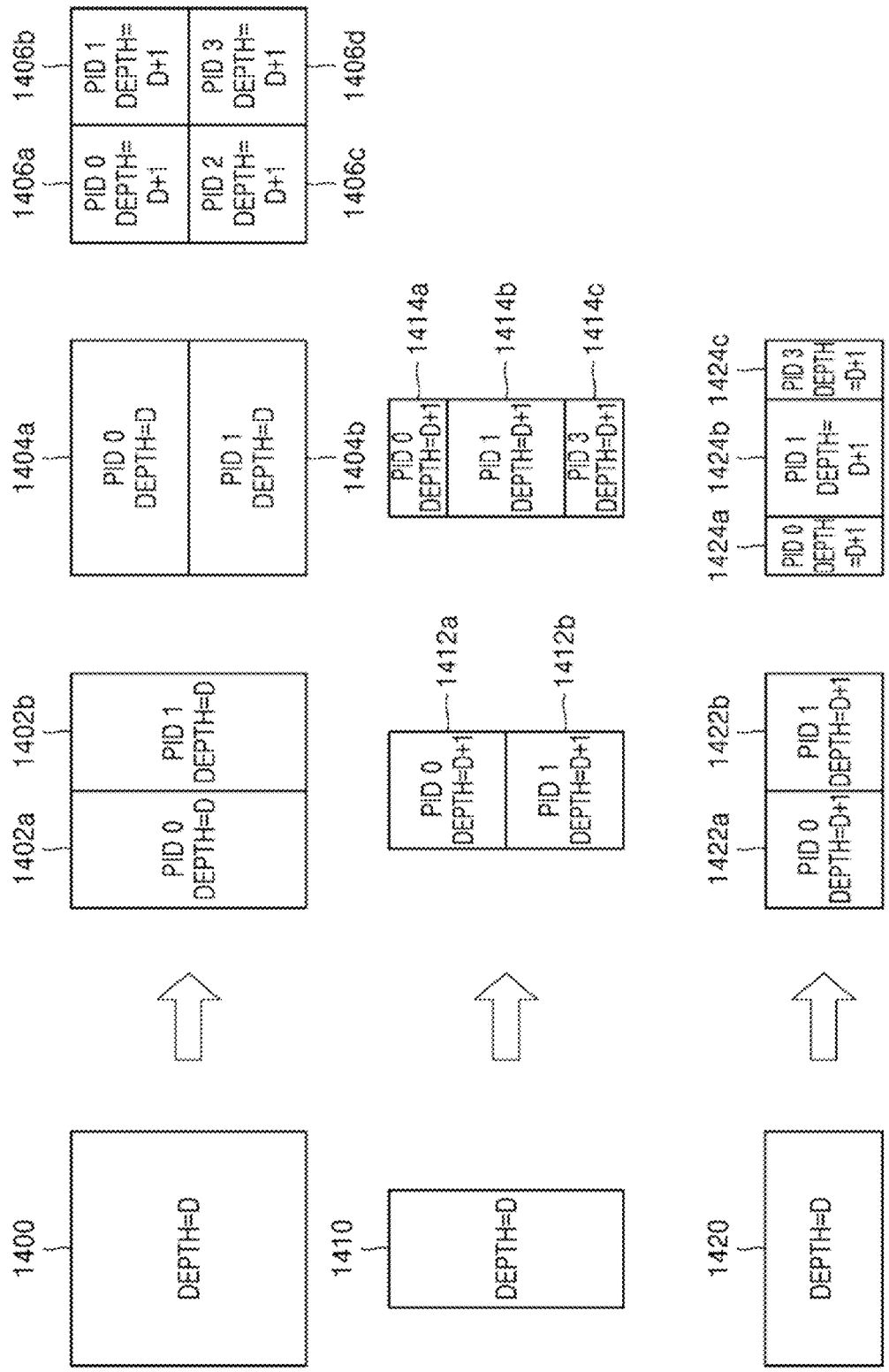
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (RN) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by spatting the first coding unit 1400 in at least one of vertical and horizontal directions based on split shape mode information. That is, the image decoding apparatus WO may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split, shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding, unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1$14b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of spat coding units do not have equal sizes, based on whether discontinuity is present in PIDs for identifying the spat coding units.

According to an embodiment, the image decoding apparatus 100 may determine whether to use a specific spatting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PCs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different, from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
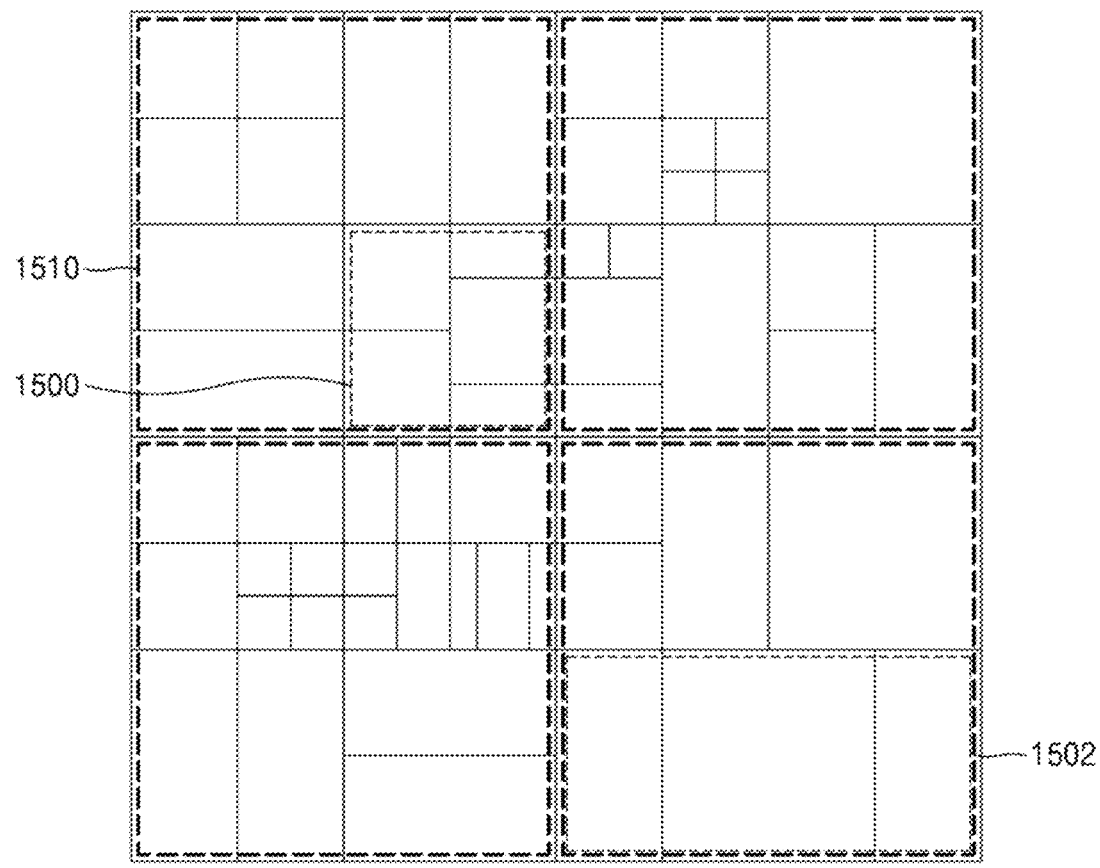
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units predetermined based on a preset condition. That is, the bitstream obtainer 110 may obtain, from the bitstream only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
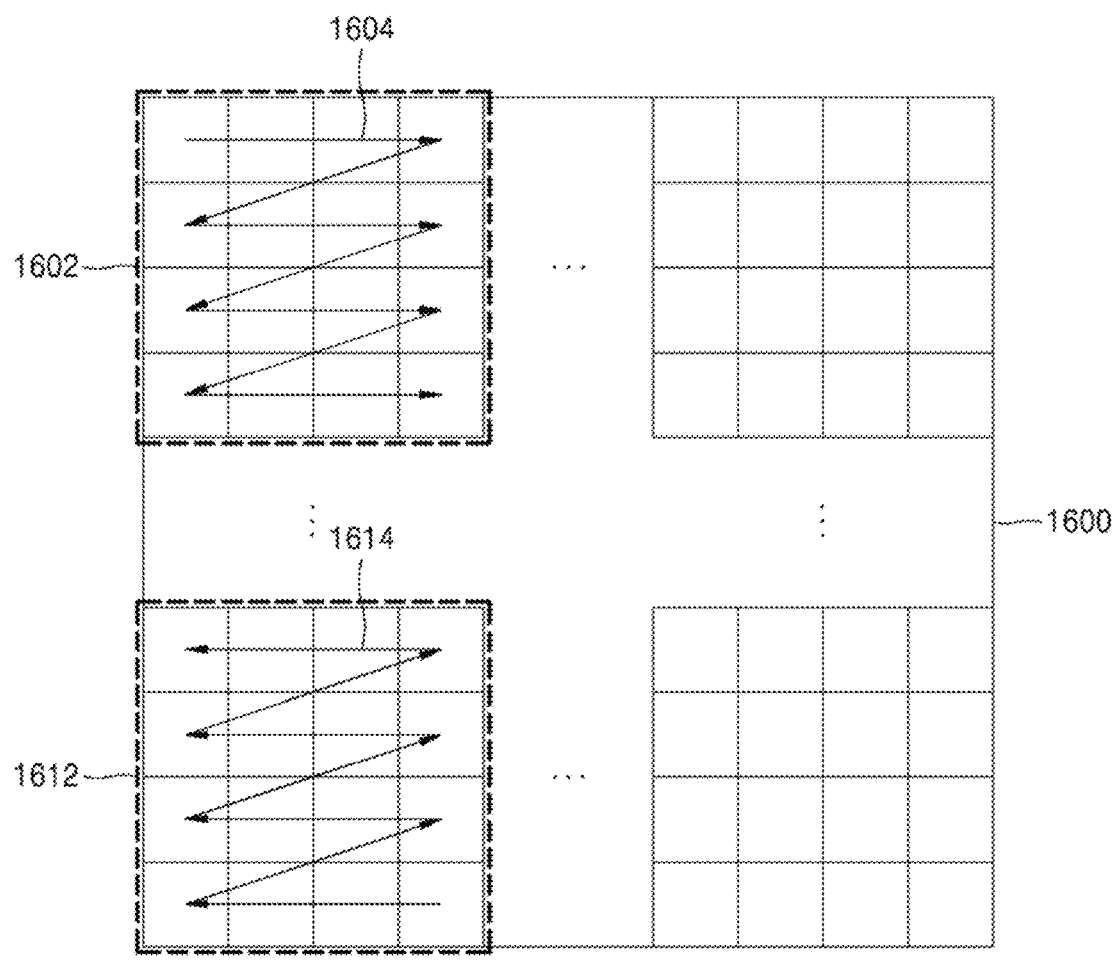
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more largest coding units it in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the bitstream obtainer 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1802 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1502 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1804 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. In contrast, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a the header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure it be described in detail.

The image decoding apparatus 100 may determine a spat rule of an image. The split rule may be predetermined between the image decoding apparatus 100 and the image encoding apparatus 200. The image decoding apparatus 100 may determine the split rule of the image, based on information obtained from a bit stream. The image decoding apparatus 100 may determine the split rule based on the information obtained from at least one of a sequence parameter set, a picture parameter set, a video parameter set, a slice header, a slice segment header, a tile header, and a the group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may predetermine to determine the split rule based on the block shape of the coding unit. However, the embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding, apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the lengths of long sides.

The ratio of the width and height of the coding unit may in 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the aiding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 17:
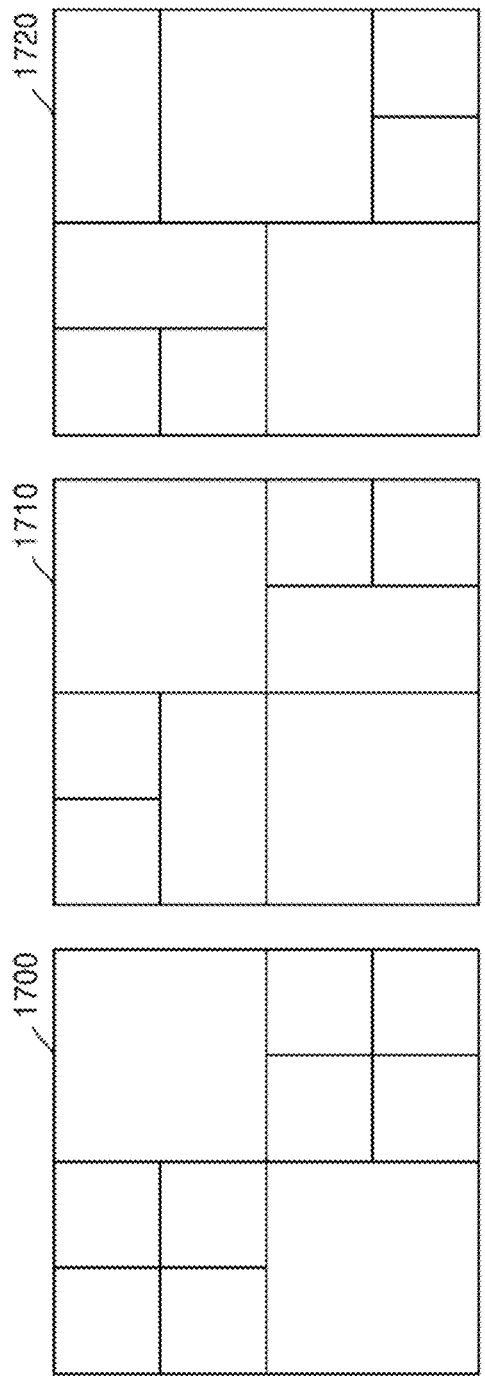
FIG. 17 illustrates coding units that are determinable for each of pictures when a split shape combination for a coding unit varies for each picture, according to an embodiment.

FIG. 17 illustrates coding units that are determinable for each of pictures when a split shape combination for a coding unit varies for each picture, according to an embodiment.

Referring to FIG. 7, the image decoding apparatus 100 may determine a split shape combination for a coding unit to differ in each picture. For example, the image decoding apparatus 100 may decode an image by using a picture 1700 that is splittable into four coding units, a picture 1710 that is splittable into two or four coding units, and a picture 1720 that is splittable into two, three, or four coding units, from among one or more pictures included in the image. To split the picture 1700 into a plurality of coding units, the image decoding apparatus 100 may use only split shape information indicating splitting into four square coding units. To split the picture 1710, the image decoding apparatus 100 may use only split shape information indicating splitting into two or four coding units. To split the picture 1720, the image decoding apparatus 100 may use only split shape information indicating splitting into two three, or four coding units. The above-described split shape combinations are embodiments for describing operations of the image decoding apparatus 100, and therefore, the above-described split shape combinations should not be interpreted to be limited to the above-described embodiments. It should be interpreted that various split shape combinations can be used for each preset data unit.

According to an embodiment, the bitstream obtainer 110 of the image decoding apparatus 100 may obtain a bitstream including an index representing a combination of split shape information for each preset data unit (for example, a sequence, a picture, a slice, a slice segment, a tile, a tile group, etc.). For example, the bitstream obtainer 110 may obtain an index representing a combination of split shape information from a sequence parameter set, a picture parameter set, a slice header, a tile header, or a tile group header. The image decoding apparatus 100 may use the obtained index to determine, for each preset data unit, a split shape combination into which coding units can be split, and thus, may use different split shape combinations for each preset data unit.

FIG. 18 illustrates various shapes of a coding unit which may be determined based on split shape mode information that can be represented as a binary code, according to an embodiment.

According to an embodiment, the image decoding apparatus 10 may split a coding unit into various shapes by using block shape information and split shape mode information obtained by the bit trey obtainer 110. Shapes into which a coding unit can be split may correspond to various shapes including shapes described above through the embodiments.

Referring to FIG. 18, the image deeding apparatus 100 may split a square coding unit in at least one direction of a horizontal direction and a vertical direction, and a non-square coding unit in the horizontal direction or the vertical direction, based on split shape mode information.

According to an embodiment, when the image decoding apparatus 100 can obtain four square coding units by splitting the square coding unit in the horizontal direction and the vertical direction, four shapes may be indicated by the split shape mode in for the square coding unit. According to an embodiment, the split shape mode information may be represented as a binary cede of 2 digits, and a binary code may be allocated to each of split shapes. For example, when a coding unit is not split, split shape mode information may be represented as (00)b, when a coding unit is split in the horizontal direction and the vertical direction, split shape mode information may be represented as (01)b, when a coding unit is split in the horizontal direction, split shape mode information may represented as (10)b, and when a coding unit is split in the vertical direction, split shape mode information may be represented as (11)b.

According to an embodiment, types of split shapes that can be indicated by split shape mode information when the image decoding apparatus 100 splits a non-square coding unit in the horizontal direction or the vertical direction may be determined according to the number of coding units into which the coding unit is to be split. Referring to FIG. 18, the image decoding apparatus 100 may split the no square coding unit up to three coding units, according to an embodiment. Also, the image decoding apparatus 100 may split a coding unit into two coding units, and in this case, split shape mode information may be represented as (10)b. The image decoding apparatus 100 may split a coding unit into three coding units, and in this case, split shape mode information may be represented as (11)b. The image decoding apparatus 100 may determine to not split a coding unit, and in this case, split shape mode information may be represented as (0)b. That is, the image decoding apparatus 100 may use variable length coding (VLC), instead of fixed length coding (FLC) so as to use a binary code representing spat shape mode information.

According to an embodiment, referring to FIG. 18, a binary code of split shape mode information indicating that a coding unit is to not be split may be represented as (0)b. In a case where a binary code of split shape mode information indicating that a coding unit is to not be split is set to (00)b, even when split shape mode information set to (01)b does not exist, a binary code of 2-bits split shape mode information has to be all used. However, as illustrated in FIG. 18, in a case where three split shapes are used for a non-square coding unit, the image decoding apparatus 100 can determine that a coding unit is to not be split, by using a binary code (0)b of 1 bit as split shape mode information, thereby efficiently using a bitstream. However, split shapes of a non-square coding unit, which are indicated by split shape mode information, should be not interpreted to be limited to three shapes illustrated in FIG. 18, and should be interpreted to be various shapes including the above-described embodiments.

Figure 19:
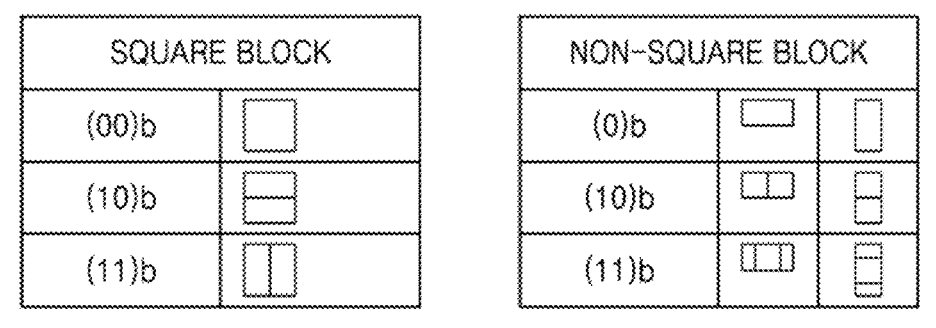

FIG. 19 illustrates other shapes of a coding unit which may e determined based on split shape mode information that can be represented as a binary code, according to an embodiment.

Referring to FIG. 19, the image decoding apparatus 100 may split a square coding unit in the horizontal direction or the vertical direction, and a non-square coding unit in the horizontal direction or the vertical direction, based on the split shape mode information. That is, the split shape mode information may indicate splitting the square coding unit in one direction. In this case, a binary code of split shape mode information indicating that a square coding unit is to not be split may be represented as (0)b. In a case where a binary code of split shape mode information indicating that a coding unit is to not be split is set to (00)b, even when split shape mode information set to (01)b does not exist, a binary code of 2-bits split shape mode information has to be all used. However, as ill in FIG. 19, in a case where three split shapes are used for a square coding unit, the image decoding apparatus 100 can determine that a coding unit is to not be split, by using a binary code (0)b of 1 bit as split shape mode information, thereby efficiently using a bitstream. However, split shapes of a square coding unit, which are indicated by split shape mode information, should be not interpreted to be limited to three shapes illustrated in FIG. 19, and should be interpreted to be various shapes including the above-described embodiments.

According to an embodiment, block shape information or split shape mode information may be represented using a binary code, and such information may be generated directly as a bitstream. Also, the block shape information or the split shape mode information that may be represented using a binary code may not be generated directly as a bitstream but may be used as an input binary code in context adaptive binary arithmetic coding (CABAC).

A process in which the image decoding apparatus 100 obtains a syntax for block shape information or split shape mode information through CABAC, according to an embodiment, will be described. The image decoding apparatus 100 may obtain a bitstream including a binary code for the syntax through the bitstream obtainer 110. The image decoding apparatus 100 may detect a syntax element indicating the block shape information or the split shape mode information by de-binarizing a bin string included in the obtained bitstream. According to an embodiment, the image decoding apparatus 100 may obtain a group of binary bin strings corresponding to a syntax element to be decoded, and may decode each of bins by using probability information. The image decoding apparatus 100 may repeat the operation until a bin sting configured with the decoded bins is identical to one of previously obtained bin strings. The image decoding apparatus 100 may determine the syntax element by performing de-binarization on the bin string.

According to an embodiment, the image decoding apparatus 100 may perform a decoding process of adaptive binary arithmetic coding to determine a syntax for the bin string, and may update a probability model for the bins obtained through the bitstream obtainer 110. Referring to FIG. 18, the bitstream obtainer 110 of the image decoding apparatus 100 may obtain a bitstream indicating a binary code representing split shape mode information, according to an embodiment. The image decoding apparatus 100 may determine a syntax for the split shape mode information by using the obtained binary code having a size of 1 bit or 2 bits. To determine the syntax for the split shape mode information, the image decoding apparatus 100 may update a probability for each bit of the binary code of 2 bits. That is, the image decoding apparatus 100 may update, according to which one of 0 or 1 a value of a first bin of the binary code of 2 bits is, a probability that a next bin will have a value of 0 or 1 in decoding.

According to an embodiment, in the process of determining the syntax, the image decoding apparatus 100 may update probabilities for the bins that are used in a process of decoding the bins of the bin string for the syntax. In this regard, the image decoding apparatus 100 may not update a probability of a specific bit of the bin string and may determine that the specific bit has a same probability.

Referring to FIG. 18, in a process of determining a syntax by using a bin string representing split shape mode information for a non-square coding unit, the image decoding apparatus 100 may determine a syntax for the split shape mode information by using a bin having a value of 0 when the non-square coding unit is not split. That is, when block shape information indicates that a current coding unit has a non-square shape, a first bin of the bin string for the split shape mode information may be 0 when the non-square coding unit is to not be split, and may be 1 when the non-square coding unit is to be split into two or three coding units. Accordingly, a probability that the first bin of the bin string of the split shape mode information for the non-square coding unit will be 0 may be ⅓, and a probability that the first bin will be 1 may be ⅔. As described above, split shape mode information indicating that a non-square coding unit is to not be split may be represented as only a bin string of 1 bit having a value of 0, such that the image decoding apparatus 100 may determine the syntax for the split shape mode information by determining, only when the first bin of the split shape mode information is 1, whether a second bin is 0 or 1. According to an embodiment, when the first bin of the split shape mode information is 1, the image decoding apparatus 100 may determine that a probability that the second bin will be 0 is equal to a probability that the second bin will be 1, and may decode a next bin.

Accordingly, in the process of determining the bins of the bin string for the split shape mode information, the image decoding apparatus 100 may use various probabilities for each of the bins. According to an embodiment, the image decoding apparatus 100 may determine a probability of a bin for split shape mode information to differ according to a direction of a non-square block. According to an embodiment, the image decoding apparatus 100 may determine a probability of a bin for split shape mode information to differ according to a width of a current coding unit or a length of a longer side of the current coding unit. According to, an embodiment, the image decoding apparatus 100 may determine a probability of a bin for split shape mode information to differ according to at least one of a shape of a current coding unit and a length of a longer side of the current coding unit.

According to an embodiment, the image decoding apparatus 100 may determine that a probability of a bin for split shape mode information to be the same with respect to coding units that are equal to or greater than a preset size. For example, the image decoding apparatus 100 may determine that a probability of a bin for spat shape mode information to be the same with respect to coding units of which lengths of longer sides are equal to or greater than 64 samples.

According to an embodiment, the image decoding apparatus 100 may determine initial probabilities for bins constituting a bin string of split shape mode information, based on a slice type (for example, an slice, a P slice, or a B slice).

Figure 20:
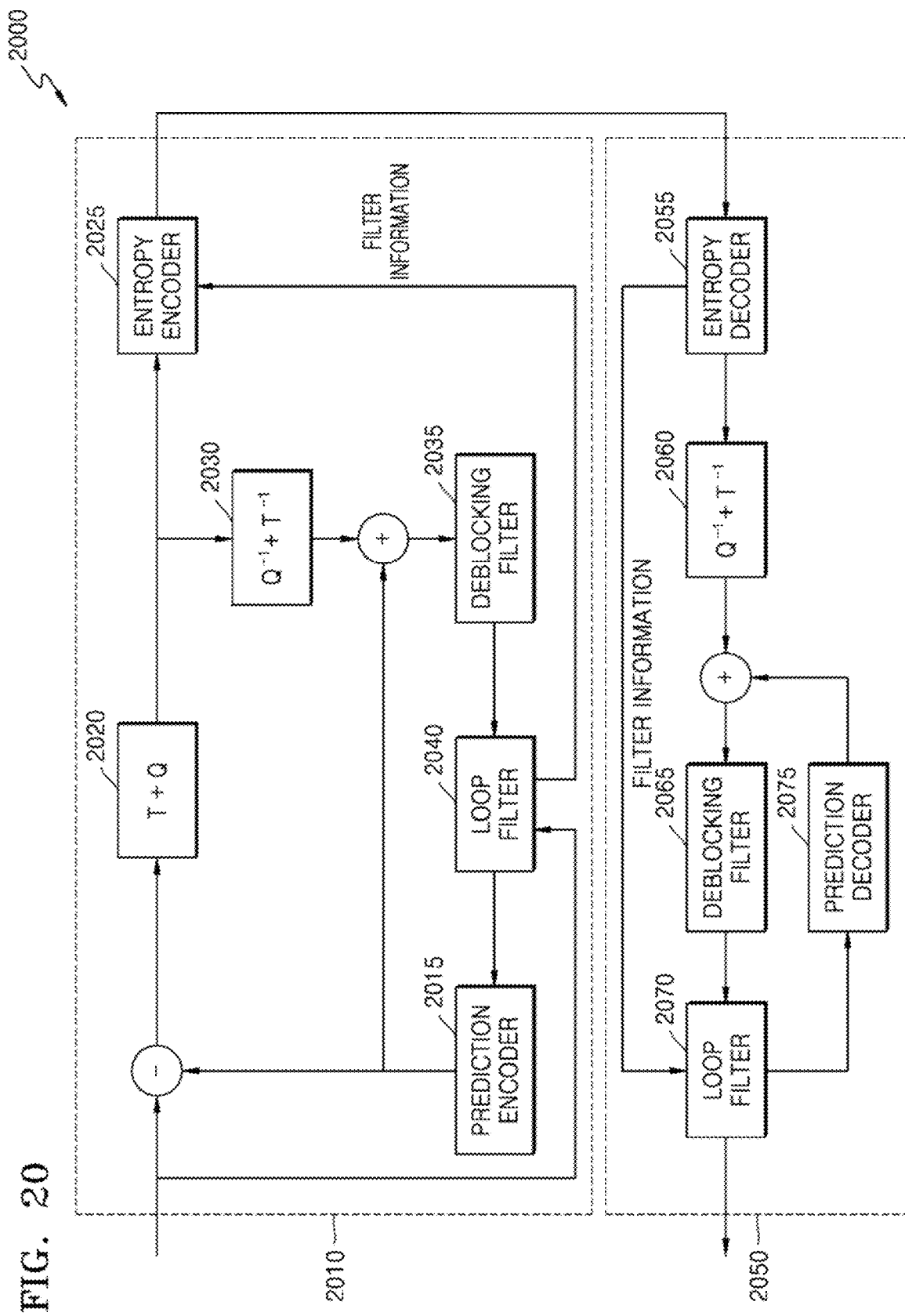
FIG. 20 is a block diagram of an image encoding and decoding system that performs loop filtering.

FIG. 20 is a block diagram of an image encoding and decoding system that performs loop filtering.

An encoder 2010 of an image encoding and decoding system 2000 may transmit an encoded bitstream of an image, and a decoder 2050 may output a reconstructed image by receiving and decoding the bitstream. In this regard, the encoder 2010 may be a configuration that is similar to the image encoding apparatus 200 to be described below, and the decoder 2050 may be a configuration that is similar to the image decoding apparatus 100.

In the encoder 2010, a prediction encoder 2015 may output prediction data through inter prediction and intra prediction, and a transformer and quantizer 2020 may output a quantized transform coefficient of residual data between the prediction data and a current input image. An entropy encoder 2025 may transform the quantized transform coefficient by encoding the quantized transform coefficient, and may output the quantized transform coefficient as a bitstream. The quantized transform coefficient may be reconstructed as spatial-domain data through an inverse-quantizer and inverse-transformer 2030, and the reconstructed spatial-domain data may be output as a reconstructed image through a deblocking filter 2035 and a loop filter 2040. The reconstructed image may be used sa reference image of a next input by a prediction encoder 2015.

Encoded image data of a bitstream received by the decoder 2050 may be reconstructed as spatial-domain residual data through an entropy decoder 2056 and an inverse-quantizer and inverse-transformer 2080. Prediction data output from a prediction decoder 2075 may be combined with the residual data to construct spatial-domain image data, and a deblocking filter 2065 and a loop filter 2070 may perform filtering on the spatial-domain image data and may output a reconstructed image for a current original image. The reconstructed image may be used as a reference image for a next original image by the prediction decoder 2075.

The loop filter 2040 of the encoder 2010 may perform loop filtering by using filter information input according a user input or a system setting. The filter information used by the loop filter 2040 may be output to the entropy encoder 2025, and may be transmitted to the decoder 2050 together with encoded image data. The loop filter 2070 of the decoder 2050 may perform loop filtering based on filter information input from the decoder 2050.

Various embodiments described above describe operations related to an image decoding method that is performed by the image decoder 100. Hereinafter, operations of the image encoding apparatus 200 that performs an image encoding method corresponding to a reverse order of the image decoding method will be described through various embodiments.

Figure 2:
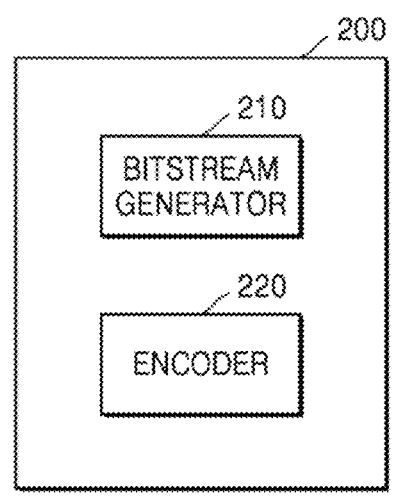
FIG. 2 is a block diagram of an image encoding apparatus according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on block shape information in at least one a shape, a direction, a ratio of a height and a width, or a size of a coding unit.

The bitstream generator 210 may generate a bitstream based on the encoded input image. For example, the bitstream generator 210 may generate a bitstream by entropy encoding a syntax element, based on the context model. Also, the image encoding apparatus 200 may transmit the bitstream to the image decoding apparatus 100.

According to an embodiment the encoder 220 of the image encoding apparatus 200 may determine a shape of a coding unit. For example, the coding unit may have a square shape or a non-square shape, and information indicating such a shape may be included in the block shape information.

According to an embodiment, the encoder 220 may determine a shape into which the coding unit is to be split. The encoder 220 may determine a shape of at least one coding unit included in a coding unit, and the bitstream generator 210 may generate a bitstream including split shape mode information including information about the shape of the coding units.

According to an embodiment, the encoder 220 may determine whether a coding unit is to be split or is to not be split. When the encoder 220 determines that a coding unit includes only one coding unit or that a coding unit is not split, the bitstream generator 210 may generate a bitstream including split shape mode information representing that the coding unit is not split. Also, the encoder 220 may split a coding unit into a plurality of coding units included in the coding unit, and the bitstream generator 210 may generate a bitstream including split shape mode information indicating that the coding unit is to be split into the plurality of coding units.

According to an embodiment, information representing the number of coding units into which a coding unit is split or a direction in which the coding unit is split may be included in the split shape mode information. For example, the split shape mode information may indicate splitting in at least one direction of a vertical direction and a horizontal direction or may indicate non-splitting.

The image encoding apparatus 200 may determine split shape mode information based on a split shape mode of a coding unit. The image encoding apparatus 200 may determine a context model based on at least one of a shape, a direction, a ratio of a width and a height or a size of the coding unit. Also, the image encoding apparatus 200 may generate, as a bitstream, information about a split shape mode for splitting the coding unit based on the context model.

To determine the context model the image encoding apparatus 200 may obtain an arrangement for matching at least one of a shape, a direction, a ratio of a width and a height, or a size of the coding unit to an index for the context model. The image encoding apparatus 200 may obtain the index for the context model based on at least one of the shape, the direction, the ratio of the width and the height, or the size of the coding unit, from the arrangement. The image encoding apparatus 200 may determine the context model based on the index for the context model.

To determine the context model, the image encoding apparatus 200 may determine the context model further based on block shape information including at least one of a shape, a direction, a ratio of a width and a height, or a size of a neighboring coding unit adjacent to the coding unit. Also, the neighboring coding unit may include at least one of coding units located to the lower-left side, left side, upper-left side, upper side, upper-right side, right side, or lower-right side of the coding unit.

Also, to determine the context model the image encoding apparatus 200 may compare a length of a width of the upper neighboring coding unit with a length of the width of the coding unit. Also, the image encoding apparatus 200 may compare lengths of heights of the left and right neighboring coding units with a length of the height of the coding unit. Also, the image encoding apparatus 200 may determine the context model based on results of the comparisons.

Operations of the image encoding apparatus 200 include contents that are similar to those of the image decoding apparatus 100 described above with reference to FIGS. 3 to 20, and thus, detailed descriptions thereof are not provided.

Hereinafter, an image encoding apparatus 2900 and an image decoding apparatus 2100 for encoding and decoding an image in a triangle prediction mode will now be described with reference to FIGS. 21 to 30.

Figure 21:
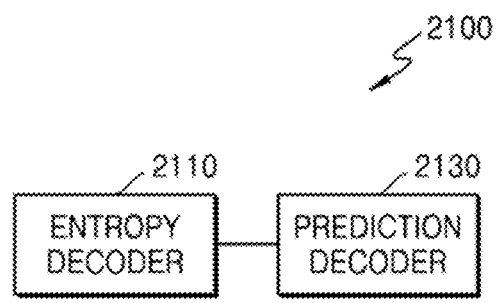
FIG. 21 is a block diagram illustrating a configuration of an image decoding apparatus according to an embodiment.

FIG. 21 is a block diagram illustrating a configuration of the image decoding apparatus 2100 according to an embodiment.

Referring to FIG. 21, the image decoding apparatus 2100 according to embodiment may include an entropy decoder 2110 and a prediction decoder 2130.

The entropy decoder 2110 and the prediction decoder 2130 may correspond to the decoder 120 shown in FIG. 1. Also, the entropy decoder 2110 and the prediction decoder 2130 may respectively correspond to the entropy decoder 2055 and the prediction decoder 2075 shown in FIG. 20. Although not illustrated in FIG. 21, the image decoding apparatus 2100 according to an embodiment may further include a bitstream obtainer for obtaining a bitstream generated as a result of image encoding.

The entropy decoder 2110 and the prediction decoder 2130 according to an embodiment may be implemented as at least one processor. The image decoding apparatus 2100 may include one or more memories (not shown) for storing input and output data of the entropy decoder 2110 and the prediction decoder 2130. Also, the image decoding apparatus 2100 may include a memory controller (not shown) for controlling data inputs and outputs of the memory (not shown).

The entropy decoder 2110 entropy decodes binary values included in the bitstream, thereby obtaining values corresponding to syntax elements. The entropy decoder 2110 may decode the bitstream through CABAC.

The bitstream may include a plurality of pieces of information to be used in reconstruction of a current block. The current block may be a block generated by being split from an image according to a tree structure, and may correspond to a block such as a largest aiding unit, a coding unit, or a transform unit, etc.

The prediction decoder 2130 may determine the current block based on block shape information and/or split shape mode information included in the bitstream corresponding to at least one level among a sequence parameter set, a picture parameter set, a video parameter set, a slice header, and a slice segment header.

The bitstream may include information indicating a prediction mode of the current block. The prediction mode of the current block may include an intra mode, an inter mode, etc. The inter mode may be a mode for predicting and reconstructing a current block based on a reference image so as to reduce temporal redundancy between images. The inter mode may include a regular merge mode, a merge mode using a differential motion vector, a triangle prediction mode, or the like which will be described below.

When prediction mode of the current block is determined, the prediction decoder 2130 reconstructs the current block according to the determined prediction mode. The reconstructed block may sere as a reference block of a block to be decoded thereafter.

In an image decoding method according to an embodiment, the current block may be reconstructed according to the triangle prediction mode. The triangle prediction mode refers to a mode in which a current block is spat into two triangular partitions, prediction blocks corresponding to the split two triangular partitions are combined according to a split shape so as to generate a final prediction block, and the current block is reconstructed based on the final prediction block. For example, the prediction decoder 2130 may determine the final prediction block as a reconstructed block. As another example, a result obtained by combining the final prediction block and residual data obtained from a bitstream may be determined as the reconstructed block.

When the triangle prediction mode is applied to the current block, the current block having a square shape has to be split into two triangular partitions, and due to the restrictions, it may be disadvantageous to apply the triangle prediction mode to the current block, in terms of a bitrate. In other words, information related to a triangle prediction mode has to be obtained from a bitstream so as to reconstruct the current block according to the final prediction block, however, even in a situation where the final prediction block is to not be applied, the information related to a triangle prediction mode is included in the bitstream such that the number of unnecessary bits may be increased.

Accordingly, in an embodiment, the entropy decoder 2110 may determine, based on a preset condition, whether to obtain the information related to a triangle prediction mode from the bitstream, and only when the preset condition is satisfied, the entropy decoder 2110 may entropy decode the information related to a triangle prediction mode from the bitstream. In contrast, when the preset condition is not satisfied, the entropy decoder 2110 may not perform entropy decoding on the information related to a triangle prediction mode. The image encoding apparatus 2900 may also determine, based on the preset condition, whether to apply the triangle prediction mode to the current block, and thus, when the preset condition is not satisfied, the image encoding apparatus 2900 may not add the information related to the triangle prediction mode to the bitstream.

The information related to a triangle prediction mode the entropy decoder 2110 obtains from the bitstream may include information indicating whether to apply the triangle prediction mode, split shape information and information indicating a motion vector for triangular partitions. In an embodiment, the entropy decoder 2110 may determine that the triangle prediction mode is to be applied to the current block when the preset condition is satisfied, and may obtain, as the information related to a triangle prediction mode, the split shape information and the information indicating a motion vector for triangular partitions from the bitstream.

In a first embodiment the entropy decoder 2110 may compare a size of the current block with a first threshold value, and when a result of the comparison satisfies the preset condition, the entropy decoder 2110 may obtain the information related to a triangle prediction mode for the current block from a bitstream. For example, when a height of the current block is smaller than the first threshold value and a width of the current block is smaller than the first threshold value, the entropy decoder 2110 may obtain the information related to a triangle prediction mode from the bitstream. In contrast, when a height or a width of the current block is equal to or greater than the first threshold value, the entropy decoder 2110 may not obtain the information related to a triangle prediction mode from the bitstream. Also, for example, when a height or a width of the current block is smaller than the first threshold value, the entropy decoder 2110 may obtain the information related to a triangle prediction mode from the bitstream. In contrast, when both a height and a width of the current block are equal to or greater than the first threshold value, the entropy decoder 2110 may not obtain the information related to a triangle prediction made from the bitstream.

The first embodiment is provided to restrict that the triangle prediction mode is to be applied to a large-size current block. Because sizes of two triangular partitions obtained from the large-size current block are large, sameness between a final prediction block and the current block may be decreased, compared to a case where the current block is quad split or ternary split. Accordingly, in the first embodiment, it is determined that the triangle prediction mode is to not be applied to the current block when the size of the current block is equal to or greater than the first threshold value, and the information related to a triangle prediction mode may not be parsed from the bitstream.

In a second embodiment, the entropy decoder 2110 may compare a size of the current block with a second threshold value, and when a result of the comparison satisfies the preset condition, the entropy decoder 2110 may obtain the information related to a triangle prediction mode for the current block from a bitstream. For example, when a value obtained by multiplying a height of a current block by a width of the current block is equal to or greater than the second threshold value, the entropy decoder 2110 may obtain the information related to a triangle prediction mode from the bitstream. In contrast, when a value obtained by multiplying a height of the current block by a width of the current block is smaller than the second threshold value, the entropy decoder 2110 may not obtain the information related to a triangle prediction mode from the bitstream. Also, for example, when both a height and a width of the current block are equal to or greater than the second threshold value, the entropy decoder 2110 may obtain the information related to a triangle prediction mode from the bitstream. In contrast, when a height or a width of the current block is smaller than the second threshold value, the entropy decoder 2110 may not obtain the information related to a triangle prediction mode from the bitstream.

The second threshold value may be smaller than the first threshold value described with reference to the first embodiment. For example, the first threshold value may be 128, and the second threshold value may be 64. In another embodiment, the second threshold value and the first threshold value may be identical. For example, both the first threshold value and the second threshold value may be 64.

The second embodiment is provided to restrict that the triangle prediction mode is to be applied to a small-size current block. When a current block of a very small size is split into two triangular partitions, complexity of an encoding and decoding process is large, compared to its coding efficiency. Accordingly, in the second embodiment, when a size of the current block is smaller than the send threshold value, it may be determined that the triangle prediction mode is to not be applied to the current block, and information related to a triangle prediction mode may not be parsed from the bitstream.

In a third embodiment, when a prediction mode of a current block is not an inter-intra combination mode, the entropy decoder 2110 may obtain information related to a triangle prediction mode from a bitstream. In contrast, when a prediction mode of the current block is the inter-intra combination mode, the entropy decoder 2110 may not obtain information related to a triangle prediction mode from the bitstream.

The inter-intra combination mode refers to a mode in which a prediction block in a reference image, the prediction block being indicated by a motion vector of the current block, is combined with a prediction block obtained from pixels in a current image such that the current block is reconstructed. That is, a current block is reconstructed by combining a prediction block obtained according to an inter mode with a prediction block obtained according to an intra mode.

In a conventional case where a current block is encoded without being split or the current block is split and then encoded, according to an inter mode, when a cost (e.g., a mite-distortion cost) is high, the inter-intra combination mode may be applied as a prediction mode of the current block. That is, the fact that the inter intra combination mode is applied to the current block may indicate that a coding efficiency is not good even when the current block is partitioned, such that when the prediction mode of the current block is the inter-intra combination mode, the entropy decoder 2110 does not obtain, from the bitstream, the information related to a triangle prediction mode that requires partitioning of the current block.

In a fourth embodiment, when the prediction mode of the current block is the merge mode using a differential motion vector, the entropy decoder 2110 may not obtain information related to a triangle prediction mode from a bitstream. In contrast, when the prediction mode of the current block is not the merge mode using a differential motion vector, the entropy decoder 2110 may obtain the information related to a triangle prediction mode from the bitstream.

To first describe the merge mode, the merge mode refers to a mode in which a merge list including motion vectors of pre-encoded or pre decoded blocks is generated to determine a motion vector of a current block, and then one of the motion vectors included in the merge list is determined to be the motion vector of the current block. The image encoding apparatus 2900 may transmit, to the image decoding apparatus 2100, only an index indicating a motion vector to be used as the motion vector of the current block from among the motion vectors included in the merge list, and the image decoding apparatus 2100 may reconstruct the motion vector of the current block according to the received index. That is, encoding of the motion vector is enabled only with the index, such that efficiency may be increased, in terms of a bitrate. The image decoding apparatus 2100 may obtain the motion vector of the current block according to the index received from the image encoding apparatus 2900, and may determine a reconstructed block, based on a prediction block indicated by the obtained motion vector.

As in the merge mode, a merge mode using a differential motion vector determines one of the motion vectors included in the merge list to be the motion vector of the current block but is different in that a differential motion vector between an actual motion vector of the current block and the motion vector selected from the merge list is signaled to the image decoding apparatus 2100. The differential motion vector may be represented as a variation distance and a variation direction. That is, the image encoding apparatus 2900 may transmit information indicating the variation distance and the variation direction corresponding to the differential motion vector, and an index indicating one of the motion vectors included in the merge list to the image decoding apparatus 2100, and the image decoding apparatus 2100 may select a motion vector indicated by the index from among the motion vectors included in the merge list, may change the selected motion vector according to the variation distance and the variation direction, and thus, may determine a motion vector of the current block.

The fact that the merge mode using a differential motion vector is applied to a current block indicates that efficiency is good when the current block is encoded/decoded by using a motion vector included in the merge list without a need to partition the current block. Accordingly, when the merge mode using a differential motion vector is applied to a current block, the entropy decoder 2110 may not obtain information related to a triangle prediction mode from a bitstream.

The entropy decoder 2110 may combine conditions described above with reference to the first embodiment, the second embodiment, the third embodiment, and the fourth embodiment so as to determine whether to obtain the information related to a triangle prediction mode from the bitstream.

For example, when the result of the comparison between the size of the current block and the first threshold value, and the result of the comparison between the size of the current block and the second threshold value satisfy the preset condition, the entropy decoder 2110 may obtain the information related to a triangle prediction mode from the bitstream. For example, when the height and the with of the current block are smaller than the first threshold value, and a result obtained by multiplying the height of the current block by the width of the current block is equal to or greater than the second threshold value, the entropy decoder 2110 may obtain the information related to a triangle prediction mode from the bitstream.

As another example, the entropy decoder 2110 may obtain the information related to a triangle prediction mode from the bitstream, according to the result of the comparison between the size of the current block and the first threshold value, and whether the prediction mode of the current block is the inter-intra combination mode. For example, when the height and the width of the current block are smaller than the first threshold value, and the prediction mode of the current block is not the inter-intra combination mode, the entropy decoder 2110 may obtain the information related to a triangle prediction mode from the bitstream.

As another example, the entropy decoder 2110 may obtain the information related to a triangle prediction mode from the bitstream, according to the result of the comparison between the size of the current block and the first threshold value, and whether the prediction mode of the current block is the merge mode using a differential motion vector. For example, when the height or the width of the current block is equal to or greater than the first threshold value, or the prediction mode of the current block is the merge mode using a differential motion vector, the entropy decoder 2110 may not obtain the information related to a triangle prediction mode from the bitstream.

As another example, the entropy decoder 2110 may obtain the information related to a triangle prediction mode from the bitstream, according to the result of the comparison between the size of the current block and the first threshold value, the result of the comparison between the size of the current block and the second threshold value, and whether the prediction mode of the current block is the inter-intra combination mode. For example, when the height and the width of the current block are smaller than the first threshold value, the value obtained by multiplying the height of the current block by the width of the current block is equal to or greater than the second threshold value, and the prediction mode of the current block is not the inter-intra combination mode, the entropy decoder 2110 may obtain the information related to a triangle prediction mode from the bitstream.

FIG. 22 illustrates an example of a syntax structure for parsing information related to a triangle prediction mode, according to an embodiment.

In S2201, the entropy decoder 2110 determines whether a prediction mode of a current mode is a regular merge mode. The regular merge mode refers to a mode in which a merge list including motion vectors of pre-encoded or pre-decoded blocks is generated to determine a motion vector of a current block, and then one of the motion vectors included in the merge list is determined to be the motion vector of the current block. When the prediction mode of the current mode is the regular merge mode, one of motion vectors included in a merge list may be selected, according to an index (merge_idx) indicating the motion vector of the current block, and a reconstructed block may be generated based on a prediction block indicated by the selected motion vector. The regular merge mode is different tam the triangle prediction mode, in that a current block is not split into two triangular partitions.

In S2202, when the prediction mode of the current mode is the regular merge mode, the entropy decoder 2110 obtains, from a bitstream, a flag (mmvd_merge_flag) indicating whether a prediction mode of a current block is the merge mode using a differential motion vector.

In S2203, when the prediction mode of the current block is the merge mode using a differential motion vector, the entropy decoder 2110 obtains, from the bitstream, information (mmvd_cand_flag) indicating one of the motion vectors included in the merge list, and obtains, from the bitstream, variation distance information (mmvd_distance_idx) and variation direction information (mmvd_direction_idx) as information indicating a differential motion vector. The prediction decoder 2130 reconstructs the current block by using mmvd_cand_flag, mmvd_distance_idx, and mmvd_direction_idx, according to the merge mode using a differential motion vector.

In S2204, when the prediction mode of the current block is not the merge mode using a differential motion vector, that is, when the prediction mode of the current block is the regular merge mode, the entropy decoder 2110 obtains, from the bitstream, information (merge_idx) indicating one of the motion vectors included in the merge list. The prediction decoder 2130 reconstructs the current block by using merge_idx according to the regular merge mode.

In S2205, the entropy decoder 2110 determines whether values of a plurality of variables (sps_clip_enabled_flag, sps_triangle_enabled_flag, MaxNumTriangleMergeCand, slice_type, and cu_skip_flag) satisfy a preset condition. Also, the entropy decoder 2110 determines whether a result of comparison between a size of the current block and a first threshold value, and a result of comparison between the size of the current block and a second threshold value satisfy the preset condition. In particular, according to A condition, when a value obtained by multiplying a width (cbWidth) of the current block by a height (cbHeight) of the current block is equal to or greater than 64, and both the width (cbWidth) and the height (cbHeight) of the current block are smaller than 128, in S2206, the entropy decoder 2110 obtains, from the bitstream, a flag (clip_flag) indicating whether the prediction mode of the current block is an inter-intra combination mode. When the prediction mode of the current block is the inter-intra combination mode, the prediction decoder 2130 reconstructs the current block by combining a prediction block obtained in a reference image with a prediction block obtained in a current image according to the inter-intra combination mode.

In S2207, when the prediction mode of the current block is not the inter-intra combination mode, the entropy decoder 2110 obtains, from the bitstream, current block split shape information (merge_triangle_split_dir) and information (merge_triangle_idx0, merge_triangle_idx1) indicating a motion vector to be used as a motion vector of triangular partitions from among motion vectors included in a merge list for the triangle prediction mode, as information related to a triangle prediction mode.

The current block split shape information may indicate whether to split the current block from its upper-left corner toward its lower-right corner or whether to split the current block from its upper-right corner toward its lower-left corner.

In FIG. 22, according to a condition by which information related to a triangle prediction mode (merge_triangle_split_dir, merge_triangle_idx0, merge_triangle_dx1) is not obtained from the bitstream, first, in S2202, when the prediction mode of the current block is the merge mode using a differential motion vector, the information related to a triangle prediction mode is not obtained from the bitstream. Also, in S2205, when the value obtained by multiplying the width of the current block by the height of the current block is smaller than 64, the width of the current block is equal to or greater than 128, or the height of the current block is equal to or greeter than 128, the information related to a triangle prediction mode is not obtained from the bitstream. Also, in S2207, when the prediction mode of the current block is the inter-intra combination mode, the information related to a triangle prediction mode is not obtained from the bitstream.

Hereinafter, a method by which the prediction decoder 2130 reconstructs a current block according to the triangle prediction mode, when a prediction mode of the current block is the triangle prediction mode and the entropy decoder 2110 obtains information related to a triangle prediction mode from a bitstream, will now be described with reference to FIGS. 23 to 27.

Figure 23:
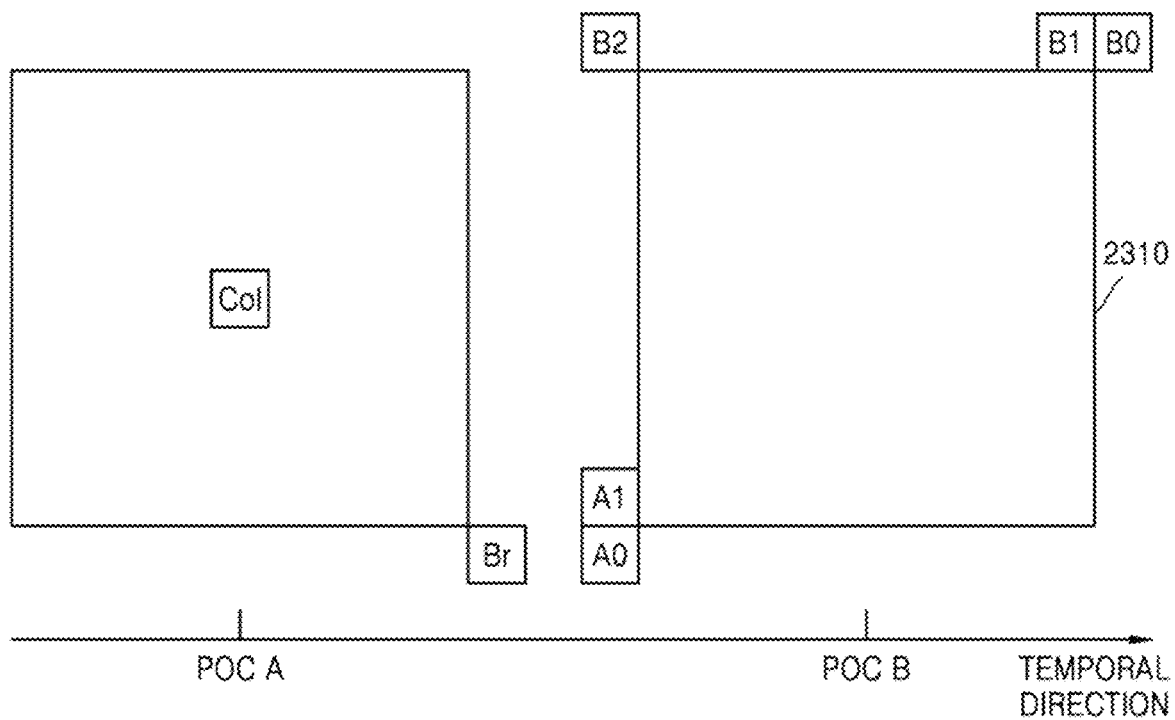
FIG. 23 is a diagram for describing a merge list generation method in a regular merge mode.

FIG. 23 is a diagram for describing a merge list generation method in a regular merge mode.

In an embodiment, when a prediction mode of a current block 2310 is a triangle prediction mode, the prediction decoder 2130 may generate a merge list for the regular merge mode according to the mew list generation method in the regular merge mode, and may determine a merge list for the triangle prediction mode by using the merge list for the regular merge mode.

In an embodiment, the prediction decoder 2130 may determine the merge list for the regular merge mode to be the merge list for the triangle prediction mode without a change.

In another embodiment, the prediction decoder 2130 may determine the merge list for the triangle prediction mode by modifying the merge list for the regular merge mode. In this regard, the fact that the merge list for the regular merge mode is modified may indicate that an order of motion vectors included in the merge list tor the regular merge mode may be changed, some motion vectors may be excluded, or a new motion vector that did not exist in the merge list is added.

First, a method of generating the merge list for the regular merge mode will now be described.

The prediction decoder 2130 may generate a merge list including motion vectors of blocks that are available from among spatial blocks being spatially related to the current block 2310 and temporal blocks being temporally related to the current block 2310. The spatial blocks and the temporal blocks may include blocks that are decoded before the current block 2310.

Referring to FIG. 23, the temporal block may include at least one of a block (Col) co-located with respect to the current block 2310 in a reference image that has a picture order count (POC) different from a POC of the current block 2310, and a block (Br) being spatially adjacent to the co-located block (Col). The block (Br) may be located in the lower right side to the block (Col) that is co-located with respect to the current block 2310. The block (Col) co-located with respect to the current block 2310 may be a block including a pixel that corresponds to a center pixel in the current block 2310 and is from among pixels included in the reference image.

The spatial block being spatially related to the current block 2310 may include at least one of a lower-left corner block A0, a lower-left block A1, an upper-right corner block B0, an upper-right block B1, and an upper-left corner block B2.

Locations of the temporal blocks and the spatial blocks shown in FIG. 23 are merely an example, and in another embodiment, locations and the number of temporal blocks and spatial blocks may vary.

The prediction decoder 2130 may determine blocks to be available, the blocks being inter predicted from among the temporal blocks and the spatial blocks. The prediction decoder 2130 may add, to the merge list, motion vectors of the available blocks according to a predetermined order. When a motion vector of a certain available block is equal to a motion vector previously included in the merge list, the motion vector of the certain available block may not be included the merge list.

When the number of motion vectors included in the merge list is smaller than a preset number, the prediction decoder 2130 may generate a new mot on vector by combining motion vectors included in the merge list and may add the generated motion vector to the merge list. When the number of motion vectors included in the merge list is smaller than a preset number, the prediction decoder 2130 may add zero vectors to the merge list until the number of motion vectors included in the merge list reaches the preset number.

When generation of the merge list for the regular merge mode is completed, the prediction decoder 2130 may determine the merge list for the regular merge mode to be the merge list for the triangle prediction mode, and may select a motion vector to be used as a motion vector of triangular partitions from among the motion vectors included in the merge list, based on information related to a triangle prediction mode.

In an embodiment, when generation of the merge list for the regular merge mode is completed, the prediction decoder 2130 may determine the merge list for the triangle prediction mode by modifying the merge list for the regular merge mode, and may select a motion vector to be used as a motion vector of triangular partitions from among the motion vectors included in the merge list, based on the information related to a triangle prediction mode.

A method of determining the merge list for the triangle prediction mode by modifying the merge list for the regular merge mode will now be described with reference to FIGS. 24 and 25.

Figure 24:
FIG. 24 illustrates an example for describing a method of generating a merge list for a triangle prediction mode from a merge list for a regular merge mode.
Figure 25:
FIG. 25 illustrates an example for describing a method of generating a merge list for a triangle prediction mode from a merge list for a regular merge mode.

FIGS. 24 and 25 illustrate examples for describing a method of generating the merge list for the triangle prediction mode from the merge list for the regular merge mode.

First, in FIG. 24, a merge list shown in the left is for the regular merge mode, in which B1, B0, A0, and B2 represent motion vectors of available spatial blocks, and Col represents a motion vector of an available temporal block.

The prediction decoder 2130 adds a uni-direction motion vector from among motion vectors included in the merge list to the merge list for the triangle prediction mode. The uni-direction motion vector refers to a motion vector that indicates a block in a reference image included in List 0 or indicates a block in a reference image included in List 1. In contrast, a bi-director) motion vector refers to a motion vector that indicates a block in a reference image included in List 0 and a block in a reference image included in List 1.

When B1, A0, B2, and Col from among B1, B0, A0, B2, and Col are uni-direction motion vectors, the prediction decoder 2130 adds B1, A0, B2, and Col to the merge list for the triangle prediction mode as shown in the right of FIG. 24. When the number of motion vectors included in the merge list for the triangle prediction mode is smaller than a preset number (e.g., 5), the prediction decoder 2130 generates a new bi-direction motion vector by combining motion vectors, which are already included in the merge list, according to a predetermined criterion, and adds the generated motion vector to the merge list. Referring to FIG. 24, it is apparent that B1+A0 generated by combining B1 and A0 is added as a last candidate to the merge list.

Next, referring to FIG. 25, the prediction decoder 2130 may generate the merge list for the triangle prediction mode by considering only a predetermined number of motion vectors from among motion vectors included in the merge list for the regular merge mode. For example, to generate the merge list for the triangle prediction mode, the prediction decoder 2130 may use only four motion vectors in an order that they are included in the merge list from among five motion vectors included in the merge list for the regular merge mode. Accordingly, the prediction decoder 2130 adds a uni-direction motion vector to the merge list for the triangle prediction mode, wherein the uni-direction motion vector is from among B1, B0, A0, and B2 that are four motion vectors included in the merge list for the regular merge mode. When B1, A0, and B2 from among B1, B0, A0, and B2 are uni-direction motion vectors, as shown in the right of FIG. 25, the prediction decoder 2130 adds B1, A0, and B2 to the merge list for the triangle prediction mode. Then, when the number of motion vectors included in the merge list for the triangle prediction mode is smaller than a preset number (e.g., 5), the prediction decoder 2130 generates a new bi-direction motion vector by combining motion vectors, which are already included in the merge list, according to a predetermined criterion, and adds the generated motion vector to the merge list. Referring to FIG. 25, it is apparent that B1+A0 generated by combining B1 and A0, and B1+B2 generated by combining B1 and B2 are added after B2 to the merge list for the triangle prediction mode.

With reference to FIGS. 24 and 25, in a case where a new motion vector (B1+A0, B1+B2, etc.) generated as a result of combination of uni-direction motion vectors is added to the merge list for the triangle prediction mode, only when the new motion vector is not equal to a motion vector pre-added to the merge list, the prediction decoder 2130 may add the new motion vector to the merge list for the triangle prediction mode.

In this regard, in an embodiment, on when the new motion vector is not equal to all motion vectors pre-added to the merge list, the prediction decoder 2130 may add the new motion vector to the merge list for the triangle prediction mode.

However, determination of whether the new motion vector is not equal to all motion vectors pre-added to the merge list increases encoding/decoding complexity, and thus, in another embodiment, the prediction decoder 2130 may add the new motion vector to the merge list for the triangle prediction mode when the new motion vector is not equal to a motion vector that is most recently added to the merge list.

When generation of the merge list for the triangle prediction mode is completed, the prediction decoder 2136 determines a motion vector of triangular partitions, based on information related to a triangle prediction mode. In detail, the prediction decoder 2130 may obtain information (e.g., an index) indicating a motion vector to be used as the motion vector of the triangular partitions from among motion vectors included in the merge list, and may determine the motion vector indicated by the information to be the motion vector of the triangular partitions. For example, according to descriptions with reference to FIG. 25, when an index indicating the motion vector of the triangular partitions indicates 0 and 1, the prediction decoder 2130 may determine B1 to be a motion vector of one triangular partition and may determine A0 to be a motion vector of another triangular partition.

When motion vectors of triangular partitions are determined, the prediction decoder 2130 determines prediction blocks indicated by the motion vectors in a reference image.

Figure 26:
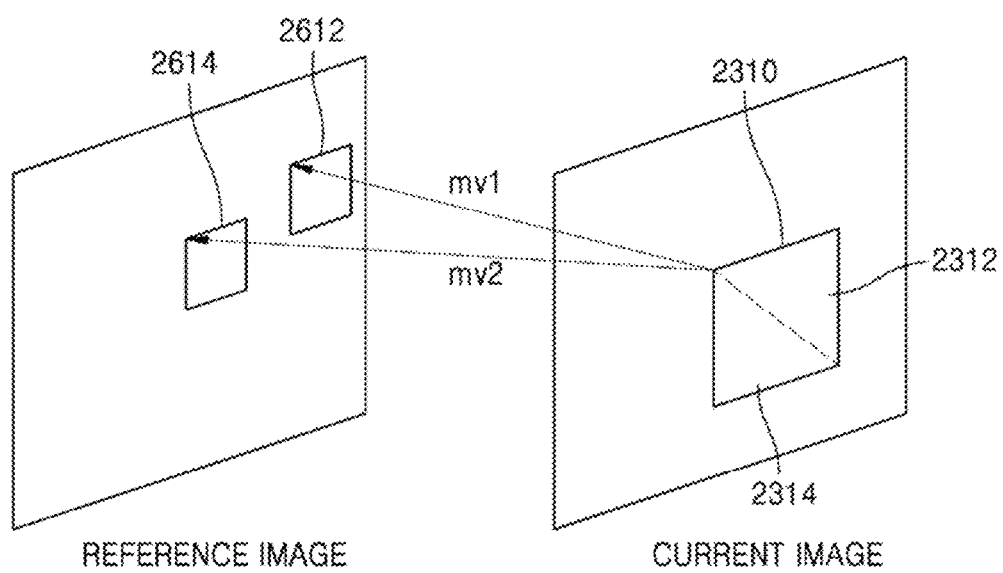
FIG. 26 is a diagram for describing a method of determining prediction blocks corresponding to two triangular partitions split from a current block.

FIG. 26 is a diagram for describing a method of determining prediction blocks 2612 and 2614 corresponding to two triangular partitions 2312 and 2314 split from the current block 2310. As illustrated in FIG. 26, the prediction decoder 2130 may obtain a first prediction block 2812 indicated by a motion vector mv1 of a first triangular partition 2312 and a second prediction block 2614 indicated by a motion vector mv2 of a second triangular partition 2314.

FIG. 26 illustrates that the first prediction block 2612 and the second prediction block 2614 are included in one reference image, but this is merely an example, and thus, the first prediction block 2612 and the second prediction block 2614 may be respectively located in different reference images.

When the prediction blocks 2612 and 2614 corresponding to the triangular partitions 2312 and 2314 are obtained, the prediction decoder 2130 generates a final prediction block by combining the p on blocks 2612 and 2614. This will now be described with reference to FIG. 27.

Figure 27:
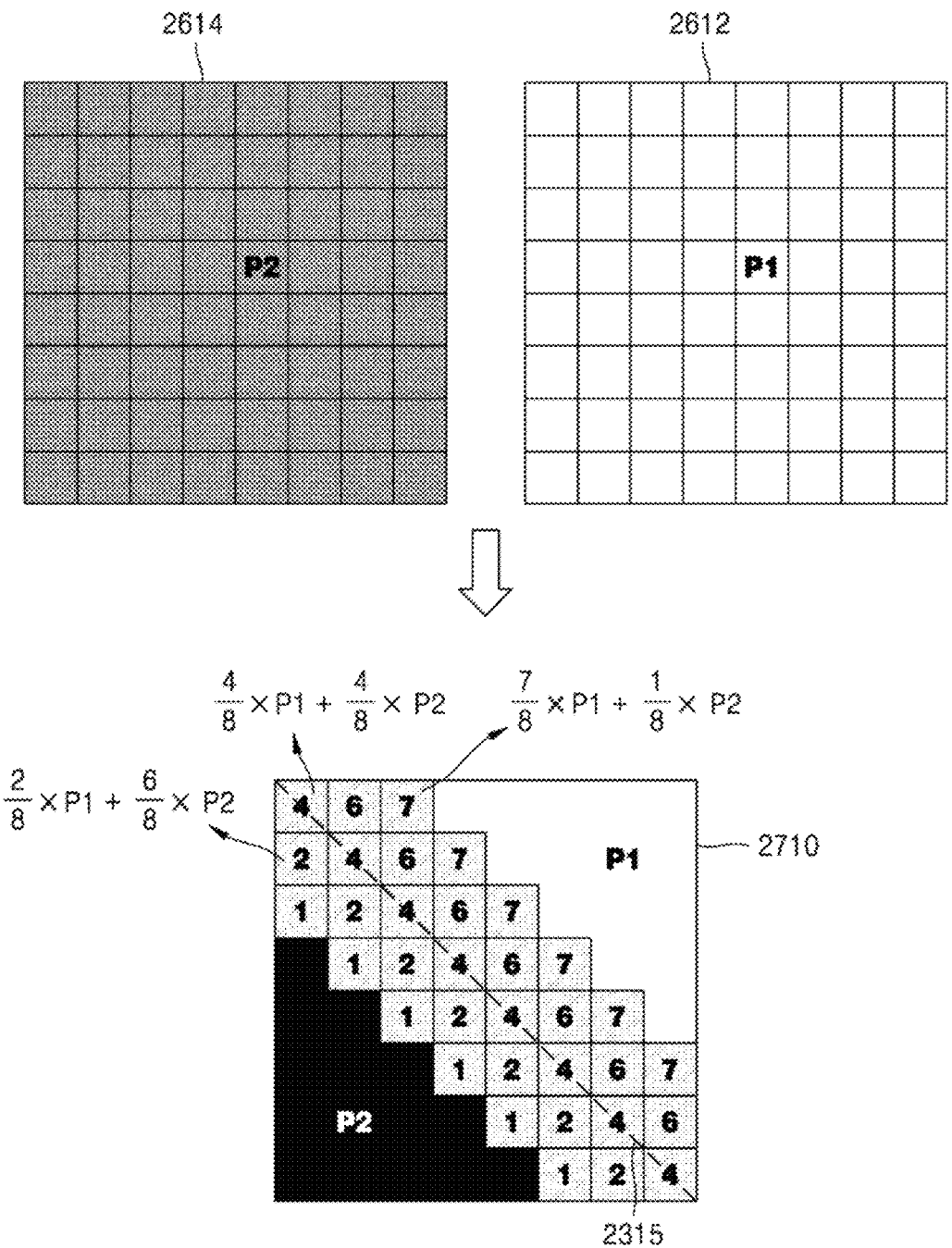
FIG. 27 is a diagram for describing a method of generating a final prediction block by combining prediction blocks corresponding to two triangular partitions.

FIG. 27 is a diagram for describing a method of generating a final prediction block 2710 by combining the prediction blocks 2612 and 2614 corresponding to the two triangular partitions 2312 and 2314.

The prediction decoder 2130 may generate the final prediction block 2710 by weighted summing first sample values P1 included in the first prediction block 2612 and second sample values P2 included in the second prediction block 2614 which correspond to the first triangular partition 2312 and the second triangular partition 2314.

Referring to FIG. 27, when the current block 2310 is split into two triangular partitions along its upper-left corner and its lower-right corner, first sample values P1 and second sample values P2 located on a boundary 2315 are summed by applying weights (4/8, 4/8) thereto, the first sample values P1 and the second sample values P being from among the first sample values P1 included in the first prediction block 2612 and the second sample values P2 included in the second prediction block 2614. Then, a higher weight may be applied to first sample values P1 in a direction toward an upper-right corner from the boundary 2315, and a higher weight may be applied to second sample values P2 in a direction toward a lower-left corner from the boundary 2315. The first sample values P1 are allocated to samples adjacent to the upper-right corner from among samples of the final prediction block 2710, and the second sample values P2 are allocated to samples adjacent to the lower-left corner from among the samples of the final prediction block 2710.

With references to FIGS. 2 and 27, a case is described, in which the current block 2310 is split into the two triangular partitions with respect to the upper-left corner and the lower-right corner. However, even when the current block 2310 is split into two triangular partitions with respect to its upper-right corner and its lower-left corner, a final prediction block may be generated in a same manner.

Figure 28:
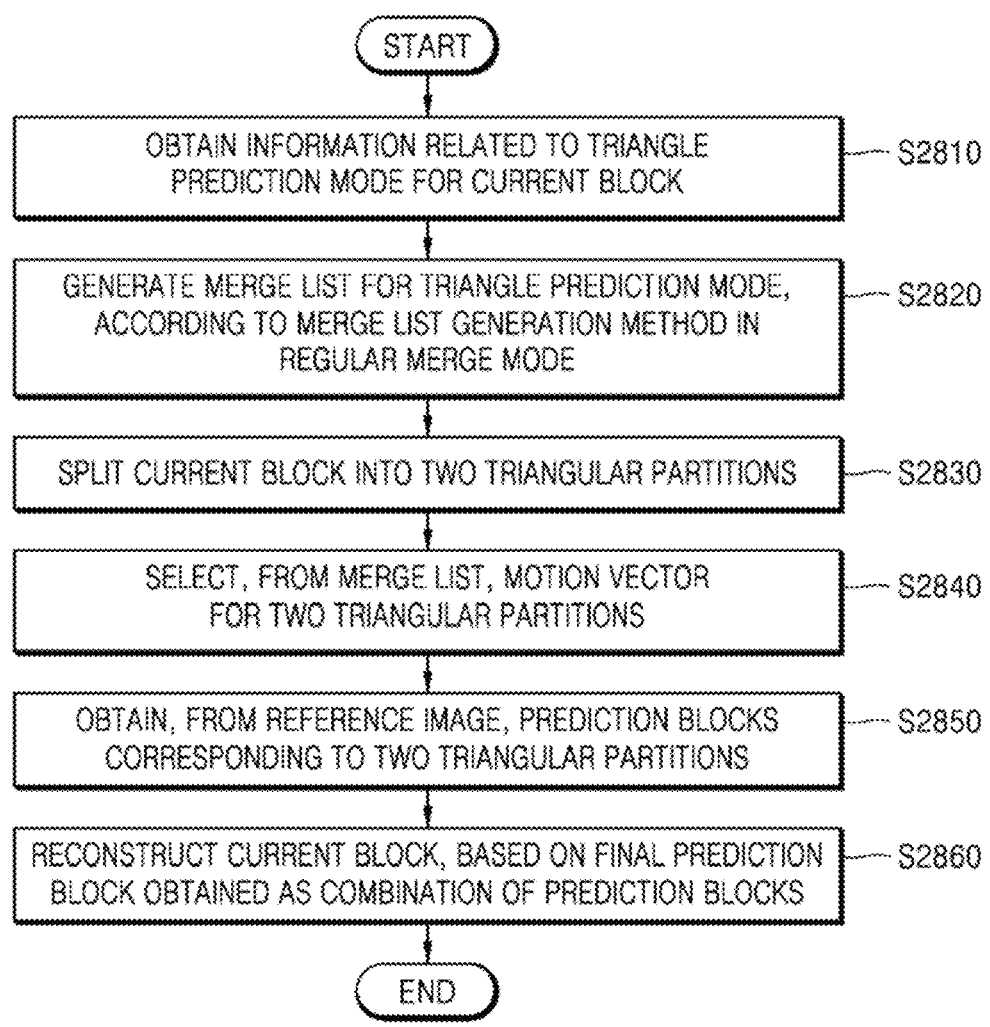
FIG. 28 is a flowchart of an image decoding method according to an embodiment.

FIG. 28 is a flowchart of an image decoding method according to an embodiment.

In operation 52810, the image decoding apparatus 2100 obtains, from a bitstream, information related to a triangle prediction mode for a current block split from a current image.

When a result of comparison between a size of the current block and a first threshold value satisfies a preset condition, the image decoding apparatus 2100 may obtain the information related to a triangle prediction mode for the current block from the bitstream. In detail, when a width of the current block is smaller than the first threshold value and a height of the current block is smaller than the first threshold value, the image decoding apparatus 2100 may obtain the information related to a triangle prediction mode from the bitstream. In contrast, when a width of the current block is equal to or greater than the first threshold value or a height of the current block is equal to or greater than the first threshold value, the image decoding apparatus 2100 may obtain the information related to a triangle prediction mode from the bitstream.

In an embodiment, the image decoding apparatus 2100 may mar size of the current block with a second threshold value, and when a result of the comparison satisfies the preset condition, the image decoding apparatus 2100 may obtain the information related to a triangle prediction mode for the current block from the bitstream. In detail, when a value obtained by multiplying a width of the current block by a height of the current block is equal to or greater than the second threshold value, the image decoding apparatus 2100 may obtain the information related toe triangle prediction mode from the it ream. In contrast, when a value obtained by multiplying a width of the current block by a height of the current block is smaller than the second threshold value, the image decoding apparatus 2100 may not obtain the information related to a triangle prediction mode from the bitstream.

When a prediction mode of the current block is not the inter-intra combination mode, the image decoding apparatus 2100 may obtain the information related to a triangle prediction mode for the current block from the bitstream, and in contrast, when the prediction mode of the current block is the inter-intra combination mode, the image decoding apparatus 2100 may not obtain the information related to a triangle prediction mode for the current block from the bitstream.

Also, when the prediction mode of the current block is the merge mode using a differential motion vector, the image decoding apparatus 2100 may not obtain the information related to a triangle prediction mode for the current block from the bitstream. In contrast, when the prediction mode of the current block is not the merge mode using a differential motion vector, the image decoding apparatus 2100 may obtain the information related to a triangle prediction mode for the current block from the bitstream.

The information related to a triangle prediction mode may include at least one of information indicating whether the triangle prediction mode is to be applied to the current block, current block split shape information, and information indicating a motion vector of triangular partitions. The current block split shape information may indicate whether to split the current block along a boundary connecting an upper left corner and a lower-night corner of the current block or whether to split the current block along a boundary connecting an upper-right corner and a lower-left corner of the current block.

In operation S2820, the image decoding apparatus 2100 generates a merge list for the triangle prediction mode, according to the merge list generation method in a regular merge mode in which the current block is reconstructed without being split into triangular partitions.

In an embodiment, the image decoding apparatus 2100 may determine the merge list for the regular merge mode to be the merge list for the triangle prediction mode without a change.

In another embodiment, the image decoding apparatus 2100 may determine the merge list for the triangle prediction mode by modifying the merge list for the regular merge mode. In this regard, the fact that the merge list for the regular merge mode is modified may indicate that an order of motion vectors included in the merge list for the regular merge mode may be changed, some motion vectors may be excluded, or a new motion vector that did not exist in the merge list is added.

The merge list generation method in a regular merge mode may indicate a method of generating a merge list including motion vectors of blocks that are available from among spatial blocks being spatially related to the current block and temporal blocks being temporally related to the current block.

In operation S2830, the image decoding apparatus 2100 splits the current block into two triangular partitions, according to the information related to a triangle prediction mode. The image decoding app 2100 may split the current block from an upper-left corner of the current block toward a lower-right corner of the current block or may split the current block from an upper-right corner of the current b k toward a lower-left corner of the current block.

In operation S2840, the image decoding apparatus 2100 selects a motion vector for the two triangular partitions according to information indicating a motion vector among motion vectors included in the merge list for the Mangle prediction mode, the information being included in the information related to a triangle prediction mode.

In operation 82850, the image decoding apparatus 2100 obtains, from a reference image, prediction blocks indicated by the motion vector for the two triangular partitions.

In operation 82860, the image decoding apparatus 2100 combines the prediction blocks corresponding to the two triangular partitions. Then, the image decoding apparatus 2100 reconstructs the current block, based on a final prediction block generated as a result of the combination of the prediction block.

In an embodiment, the image decoding apparatus 2100 may determine the final prediction block to be a reconstructed block. In another embodiment, the image decoding apparatus 2100 may combine the final prediction block with a residual block obtained based on information included in the bitstream and may determine a combination block to be a reconstructed block.

Figure 29:
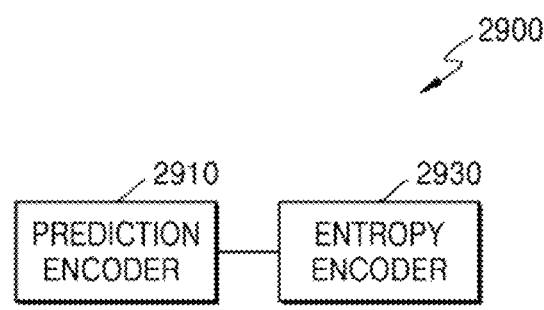
FIG. 29 is a block diagram of a configuration of an image encoding apparatus according to an embodiment.

FIG. 29 is a block diagram of a configuration of the image encoding apparatus 2900 according to an embodiment.

Referring to FIG. 29, the image encoding apparatus 2900 may include a prediction encoder 2910 and an entropy encoder 2930. The prediction encoder 2910 and the entropy encoder 2930 may respectively correspond to the encoder 220 and the bitstream generator 210 shown in FIG. 2. Also, the prediction encoder 2910 and the entropy encoder 2930 may respectively correspond to the prediction encoder 2015 and the entropy encoder 2025 shown in FIG. 20.

The prediction encoder 2910 and the entropy encoder 2930 according to an embodiment may be implemented as at least one processor. The image encoding apparatus 2900 may include one or more memories (not shown) for storing input and output data of the prediction encoder 2910 and the entropy encoder 2930. Also, the image encoding apparatus 2900 may include a memory controller (not shown) for controlling data inputs and outputs of the memory (not shown).

The prediction encoder 2910 determines a prediction mode of a current block. The prediction encoder 2910 may determine the prediction mode of the current block to be a regular merge mode, a merge mode using a differential motion vector, an inter-intra combination mode, a triangle prediction mode, or an intra mode.

The prediction encoder 2910 may encode the current block according to the triangle prediction mode. In particular, when the prediction mode of the current block is determined to be the triangle prediction mode, the prediction encoder 2910 generates a merge list for the triangle prediction mode. A method of generating the merge list for the triangle prediction mode is same as that described with reference to FIGS. 23 to 25, and thus, detailed descriptions thereof are not provided here. The prediction encoder 2910 splits the current block into two triangular partitions, and selects a motion vector to be used as a motion vector of the two triangular partitions from among motion vectors included in the merge list. The prediction encoder 2910 signals, to the image decoding apparatus 2100, information related to a triangle prediction mode, in detail, information in the motion vector of the two triangular partitions and information indicating a split shape of the current block.

In a certain case, encoding the current block in the triangle prediction mode may not be good in terms of coding efficiency, and in this case, when the information related to a triangle prediction mode is included in a bitstream, the number of unnecessary bits may increase.

Accordingly, in an embodiment, before the information related to a triangle prediction mode is generated, whether it is appropriate to encode the current block in the triangle prediction mode may be first determined based on a preset condition, and then, whether to generate the information related to a triangle prediction mode may be adaptively determined according to a result of the determination.

In the first embodiment, the prediction encoder 2910 may compare a size of the current block with a first threshold value, and when a result of the comparison satisfies the preset condition, the prediction encoder 2910 may determine the prediction mode of the current block to be the triangle prediction mode. For example, when a height of the current block is smaller than the first threshold value and a width of the current block is smaller than the first threshold value, the prediction encoder 2910 may determine the prediction mode of the current block to be the triangle prediction mode. In contrast, when a height or a width of the current block is equal to or greater than the first threshold value, the prediction encoder 2910 may determine the prediction mode of the current block to be a mode other than the triangle prediction mode. Also, for example, when a height or a width of the current block is smaller than the first threshold value, the prediction encoder 2910 may determine the prediction mode of the current block to be the triangle prediction mode. In contrast, when both a height and a width of the current block are equal to or greater than the first threshold value, the prediction encoder 2910 may determine the prediction mode of the current block to be a mode other than the triangle prediction mode.

The first embodiment Is provided to restrict that the triangle prediction mode is to be applied to a large-size current block. Because sizes of two triangular partitions obtained from the large-size current block are large, sameness between a final prediction block and the current block may be decreased, compared to a case where the current block is quad split or ternary split. Accordingly, in the first embodiment it is determined that the triangle prediction mode is to not be applied to the current block when the size of the current block is equal to or greater than the first threshold value, and the information related to a triangle prediction mode may not be generated.

In the second embodiment, the prediction encoder 2910 may compare size of the current block with a second threshold value, and when a result of the comparison satisfies the preset condition, the prediction encoder 2910 may determine the prediction mode of the current block to be the triangle prediction mode. For example, when a value obtained by multiplying a height of a current block by a width of the current block is equal to or greater than the second threshold value, the prediction encoder 2910 may determine the prediction mode of the current block to be the triangle prediction mode. In contrast, when a value obtained by multiplying a height of the current block by a width of the current block is smaller than the second threshold value, the prediction encoder 2910 may determine the prediction mode of the current block to be a mode other than the triangle prediction mode. Also, for example, when both a height and a width of the current block are equal to or greater than the second threshold value, the prediction encoder 2910 may determine the prediction mode of the current block to be the triangle prediction mode. In contrast, when a height or a width of the current block is smaller than the second threshold value, the prediction encoder 2910 may determine the prediction mode of the current block to be a mode other than the triangle prediction mode.

The second threshold value may be smaller than the first threshold value described with reference to the first embodiment. For example, the first threshold value may be 128, and the second threshold value may be 64. In another embodiment, the second threshold value and the first threshold value may be identical. For example, both the first threshold value and the second threshold value may be 64.

The second embodiment is provided to restrict that the triangle prediction mode is to be applied to a small-size current block. When a current block of a very small size is split into two triangular partitions, complexity of an encoding and decoding process is large, compared to its in efficiency. Accordingly, in the second embodiment, when a size of the current block is smaller than the second threshold value, it may be determined that the triangle prediction mode is to not be applied to the current block, and the information related to a triangle prediction mode may not be generated.

In the third embodiment, when the prediction mode of the current block is not the inter-infra combination mode, the prediction encoder 2910 may determine the prediction mode of the current block to be the triangle prediction mode. In contrast, when the prediction mode of the current block is the inter-intra combination mode, the prediction encoder 2910 may not determine whether to encode the current block in the triangle prediction mode.

In a conventional case where a current block is encoded without being split or the current block is split and then encoded, according to an inter mode, when a cost (e.g., a rate-distortion cost) is high, the inter-intra combination mode may be applied as a prediction mode of the current block. That is, the fact that the inter-intra combination mode is applied to the current block may indicate that a coding efficiency is not good even when the current block is partitioned, such that, only when the prediction mode of the current block is not the inter-intra combination mode, the prediction encoder 2910 may determine the prediction mode of the current block to be the triangle prediction mode, and may generate the information related to a triangle prediction mode.

In the fourth embodiment, when the prediction mode of the current block is the merge mode using a differential motion vector, the prediction encoder 2910 may not determine whether to encode the current block according to the triangle prediction mode. In contrast, when the prediction mode of the current block is not the merge mode using a differential motion vector, the prediction encoder 2910 may determine the prediction mode of the current block to be the triangle prediction mode.

The fact that the merge mode using a differential motion vector is applied to a current block indicates that efficiency is good when the current block is encoded/decoded by using a motion vector included in the merge list without a need to partition the current block. Accordingly, when the merge mode using a differential motion vector is applied to the current block, the prediction encoder 2910 may not determine whether to encode the current block in the triangle prediction mode.

The prediction encoder 2910 may combine condition described above with reference to the first embodiment, the second embodiment, the third embodiment, and the fourth embodiment so as to determine whether to encode the current block in the triangle prediction mode.

For example, when the result of the comparison between the size of the current block and the first threshold value, and the result of the comparison between the size of the current block and the second threshold value satisfy the preset condition, the prediction encoder 2910 may determine the prediction mode of the current block to be the triangle prediction mode. For example, when the height and the width of the current block are smaller than the first threshold value, and a result obtained by multiplying the height of the current block by the width of the current block is equal to or greater than the second threshold value, the prediction encoder 2810 may determine the prediction mode of the current block to be the triangle prediction mode.

As another example, the prediction encoder 2910 may determine whether to encode the current block in the triangle prediction mode, according to the result of the comparison between the size of the current block and the first threshold value, and whether the prediction mode of the current block is the inter-infra combination mode. For example, when the height and the width of the current block are smaller than the first threshold value, and the prediction mode of the current block is not the inter-intra combination mode, the prediction encoder 2910 may determine the prediction mode of the current block to be the triangle prediction mode.

As another example, the prediction encoder may determine whether to encode the current block in the triangle prediction mode, according to the result of the comparison between the size of the current block and the first threshold value, and whether the prediction mode of the current block is the merge mode using a differential motion vector. For example, when the height or the width of the current block is equal to or greater than the first threshold value, or the prediction mode of the current block is the merge mode using a differential motion vector, the prediction encoder 2910 may not determine whether to encode the current block in the triangle prediction mode.

As another example, the prediction encoder 2910 may determine whether to encode the current block in the triangle prediction mode, according to the result of the comparison between the size of the current block and the first threshold value, the result of the comparison between the size of the current block and the second threshold value, and whether the prediction mode of the current block is the inter-intra combination mode. For example, when the height and the width of the current block are smaller than the first threshold value, the value obtained by multiplying the height of the current block by the width of the current block is equal to or greater than the second threshold value, and the prediction mode of the current block is not the inter-intra combination mode, the prediction encoder 2910 may determine the prediction mode of the current block to be the triangle prediction mode.

In an embodiment, the prediction encoder 2910 may generate syntax elements (mmvd_merge_flag, mmvd_cand_flag, mmvd_distance_idx, mmvd_direction_idx, merge_idx, clip_flag, merge_triangle_split_dir, merge_triangle_idx0, and merge_triangle_idx1) according to the syntax structure shown in FIG. 22. The syntax elements may be entropy encoded by the entropy encoder 2930 and then may be included in a bitstream.

The entropy encoder 2930 may generate the bitstream by entropy encoding values corresponding to the syntax elements. The entropy encoder 2930 may encode the values corresponding to the syntax elements, according to CABAC.

The bitstream may include a plurality of pieces of information to be used in reconstruction of a current block. The current block may be a block generated by being split from an image according to a tree structure, and may correspond to a block such as a largest coding unit, a coding unit, or a transform unit, etc.

The bitstream that corresponds to at least one level among a sequence parameter set, a picture parameter set, a video parameter set, a slice header, and a slice segment header may include block shape information and/or split shape mode information, and the image decoding apparatus 2100 may determine the current block in a current image, based on the block shape information and/or the split shape mode information.

The bitstream may include information indicating a prediction mode of the current block. The prediction mode of the current block may include a regular merge merge mode using a differential motion vector, an inter-intra combination mode, a triangle prediction mode, or an intra mode.

Also, when the prediction mode of the current block is determined to be the triangle prediction mode, the bitstream may include information related to a triangle prediction mode. The information related to a triangle prediction mode may include at least one of information indicating whether the prediction mode of the current block is the triangle prediction mode, split shape information for splitting the current block into two triangular partitions, and information indicating a motion vector of the two triangular partitions.

Figure 30:
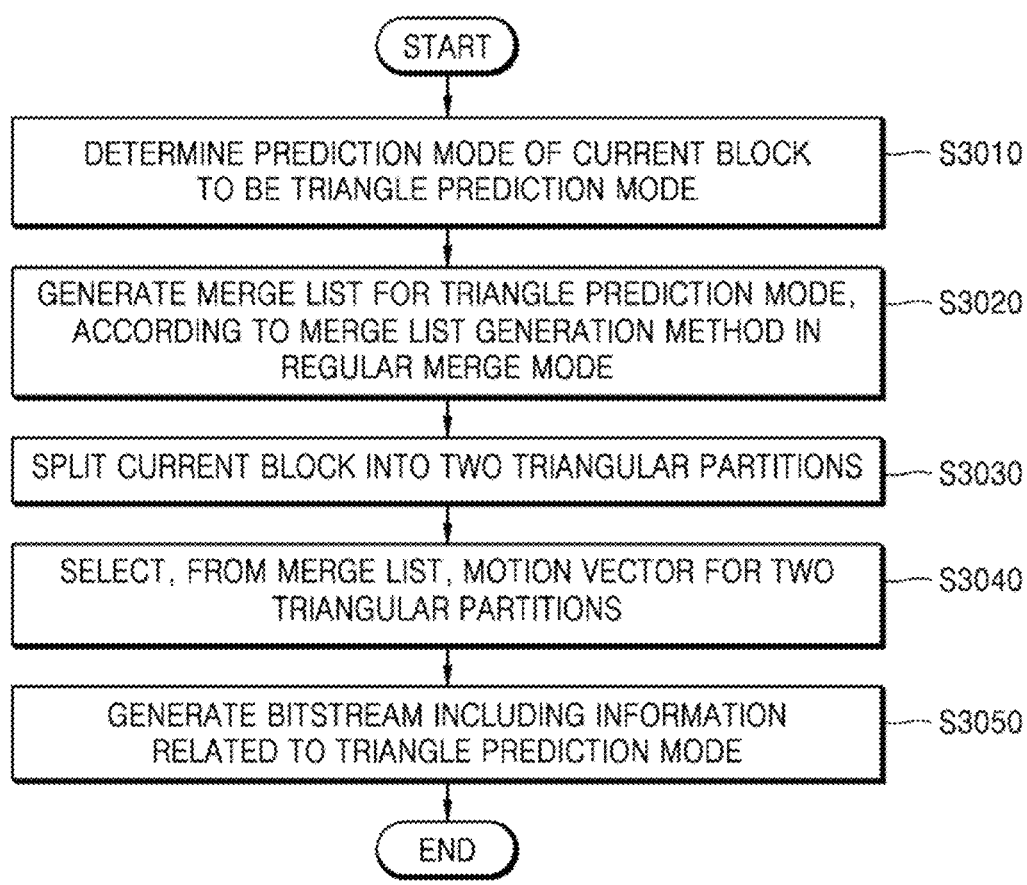
FIG. 30 is a flowchart of an image encoding method according to an embodiment.

FIG. 30 is a flowchart of an image encoding method according to an embodiment.

In S3010, the image encoding apparatus 2900 determines a prediction mode of a current block to be a triangle prediction mode, the current block being split from a current image.

When a result of comparison between a size of the current block and a first threshold value satisfies a preset condition, the image encoding apparatus 2900 may determine the prediction mode of the current block to be the triangle prediction mode. In detail, when a width of the current block is smaller than the first threshold value and a height of the current block is smaller than the first threshold value, the image encoding apparatus 2900 may determine the prediction mode of the current block to be the triangle prediction mode. In contrast, when a width of the current block is equal to or greater than the first threshold value or a height of the current block is equal to or greater than the first threshold value, the image encoding apparatus 2900 may determine the prediction mode of the current block to be a mode other than the triangle prediction mode.

In an embodiment, the image encoding apparatus 2900 may compare a size of the current block with a second threshold value, and when a result of the comparison satisfies the preset condition, the image encoding apparatus 2900 may determine the prediction mode of the current block to be the triangle prediction mode. In detail, when a value obtained by multiplying a width of the current block by a height of the current block is equal to or greater than the second threshold value, the image encoding apparatus 2900 may determine the prediction mode of the current block to be the triangle prediction mode. In contrast, when a value obtained by multiplying a width of the current block by a height of the current block is smaller than the second threshold value, the image encoding apparatus 2900 may determine the prediction mode of the current block to be a mode other than the triangle prediction mode.

When the prediction mode of the went block is not the inter-intra combination mode, the image encoding apparatus 2900 may determine the prediction mode of the current block to be the triangle prediction mode, and in contrast, when the prediction mode of the current block is the inter-intra combination mode, the image encoding apparatus 2900 may not determine whether to encode the current block in the triangle prediction mode.

Also, when the prediction mode of the current block is the merge mode using a differential motion vector, the image encoding apparatus 2900 may not determine whether to encode the current block in the triangle prediction mode. In contrast, when the prediction mode of the current block is not the merge mode using a differential motion vector, the image encoding apparatus 2900 may determine the prediction mode of the current block to be the triangle prediction mode.

In S3020, the image encoding apparatus 2900 generates a merge list for the triangle prediction mode, according to a merge list generation method in a regular merge mode in which a current block is encoded without being split into triangular partitions.

In an embodiment, the image encoding apparatus 2900 may determine the merge list for the regular merge mode to be the merge list for the triangle prediction mode without a change In another embodiment, the image encoding apparatus 2900 may determine the merge list for the triangle prediction mode by modifying the merge list for the regular merge mode. In this regard, the fact that the merge list for the regular merge mode is modified may indicate that an order of motion vectors included in the merge list for the regular merge mode may be changed, some motion vectors may be excluded, or a new motion vector that did not exist in the merge list is added.

The merge list generation method in the regular merge mode may indicate method of generating a merge list including motion vectors of blocks that are available from among spatial blocks being spatially related to a current block and temporal blocks being temporally related to the current block.

In S3030, the image encoding apparatus 2900 splits the current block into two triangular partitions. The image encoding apparatus 2900 may split the current block from an upper-left corner of the current block toward a lower-right corner of the current block or may split the current block from an upper-right corner of the current block toward a lower-left corner of the current block.

In operation S3040, the image encoding apparatus 2900 selects a motion vector to be used as a motion vector of the two triangular partitions from among motion vectors included in the merge list for the triangle prediction mode. The image encoding apparatus 2900 may select a motion vector among motion vectors included in the merge list that causes a smallest cost (e.g., a rate-distortion cost) for the two triangular partitions.

In operation S3050, the image encoding apparatus 2900 generates a bitstream including information related to a triangle prediction mode.

The information related to a triangle prediction mode may include at least one of information indicating whether the triangle prediction mode is to be applied to the current block, current block split shape information, and information indicating a motion vector of triangular partitions. The current block split shape information may indicate whether to split the current block along a boundary connecting an upper-left corner and a lower-right corner of the current block or whether to split the current block along a boundary connecting an upper-right corner and a lower-left corner of the current block.

Meanwhile, the embodiments of the disclosure may be written as programs that are executable on a computer, and the programs may be stored in a medium.

The medium may continuously store the computer-executable programs or may temporarily store the computer-executable programs for execution or downloading. Also, the medium may be any one of various recording media or storage media in which a single piece or plurality of pieces of hardware are combined, and the medium is not limited to those directly connected to a certain computer system, but may be distributed over a network. Examples of the medium include magnetic media such as a hard disk, a floppy disk, and a magnetic tape, optical recording media such as compact disc-read only memory (CD-ROM) and a digital versatile disc (DVD), magneto-optical media such as floptical disk, read only memory (ROM), random access memory (RAM), a flash memory, etc. which are configured to store program instructions. Also, other examples of the medium include recording media and storage media managed by application stores distributing applications or by websites, servers, and the like supplying or distributing other various types of software.

While one or more embodiments of the disclosure are described in detail with reference to exemplary embodiments above, it will be understood by one of ordinary skill in the art that the disclosure is not limited to the embodiments, and various changes in form and details may be made therein with cut departing from the spirit and scope of the disclosure.

The invention claimed is:

1. An image decoding method performed by an image decoding apparatus, the image decoding method comprising:
   obtaining information indicating whether an inter-intra combination mode is applied to a current block;
   when the information indicates that the inter-intra combination mode is not applied to the current block, obtaining, from a bitstream, partition shape information for the current block, first motion vector related information for a first partition and second motion vector related information for a second partition;
   obtaining a first prediction sample using a motion vector of a first candidate block indicated by the first motion vector related information among a plurality of candidate blocks included in a merge list;
   obtaining a second prediction sample using a motion vector of a second candidate block indicated by the second motion vector related information among the plurality of candidate blocks included in the merge list;
   determining a weight value to be applied to the first prediction sample and the second prediction sample using the partition shape information;

obtaining a third prediction sample for the current block by combining the first prediction sample and the second prediction sample using the weight value; and reconstructing the current block by using the third prediction sample for the current block.

2. A computer-readable medium having recorded thereon a program which, when executed by at least one processor, causes the at least one processor to:

obtain information indicating whether an inter-intra combination mode is applied to a current block;

when the information indicates that the inter-intra combination mode is not applied to the current block, obtain, from a bitstream, partition shape information for the current block, first motion vector related information for a first partition and second motion vector related information for a second partition;

obtain a first prediction sample using a motion vector of a first candidate block indicated by the first motion vector related information among a plurality of candidate blocks included in a merge list;

obtain a second prediction sample using a motion vector of a second candidate block indicated by the second motion vector related information among the plurality of candidate blocks included in the merge list;

determine a weight value to be applied to the first prediction sample and the second prediction sample using the partition shape information;

obtain a third prediction sample for the current block by combining the first prediction sample and the second prediction sample using the weight value; and reconstruct the current block by using the third prediction sample for the current block.

3. An image decoding apparatus comprising:

an entropy decoder configured to obtain information indicating whether an inter-intra combination mode is applied to a current block, and when the information indicates that the inter-intra combination mode is not applied to the current block, obtain, from a bitstream, partition shape information for the current block, first motion vector related information for a first partition and second motion vector related information for a second partition; and a prediction decoder configured to obtain a first prediction sample using a motion vector of a first candidate block indicated by the first motion vector related information among a plurality of candidate blocks included in a merge list, obtain a second prediction sample using a motion vector of a second candidate block indicated by the second motion vector related information among the plurality of candidate blocks included in the merge list, determine a weight value to be applied to the first prediction sample and the second prediction sample using the partition shape information, obtain a third prediction sample for the current block by combining the first prediction sample and the second prediction sample by using the weight value, and reconstruct the current block by using the third prediction sample.

4. An image encoding method performed by an image encoding apparatus, the image encoding method comprising:

determining whether an inter-intra combination mode is applied to a current block;

when the inter-intra combination mode is not applied to the current block, determining a partition shape for the current block, and selecting, among a plurality of candidate blocks comprised in a merge list, a first candidate block for a first partition and a second candidate block for a second partition; and generating a bitstream comprising information indicating whether the inter-intra combination mode is applied to the current block, first motion vector related information indicating the first candidate block, second motion vector related information indicating the second candidate block, and partition shape information for the current block, wherein the current block corresponds to a third prediction sample obtained by combining a first prediction sample and a second prediction sample, the first prediction sample is determined based on a motion vector of the first candidate block, and the second prediction sample is determined based on a motion vector of the second candidate block, and the first prediction sample and the second prediction sample are combined based on a weight value determined using the partition shape information.

5. A non-transitory computer-readable medium for recording a bitstream, the bitstream comprising:

information indicating whether an inter-intra combination mode is applied to a current block;

first motion vector related information indicating a first candidate block;

second motion vector related information indicating a second candidate block; and partition shape information for the current block, wherein when the inter-intra combination mode is not applied to the current block, a partition shape for the current block is determined, wherein the first candidate block for a first partition and the second candidate block for a second partition are selected among a plurality of candidate blocks comprised in a merge list, wherein the current block corresponds to a third prediction sample obtained by combining a first prediction sample and a second prediction sample, wherein the first prediction sample is determined based on a motion vector of the first candidate block, and the second prediction sample is determined based on a motion vector of the second candidate block, and wherein the first prediction sample and the second prediction sample are combined based on a weight value determined using the partition shape information.

* * * * *